US012696314B2

(12) United States Patent (10) Patent No.: US 12,696,314 B2
Prasad et al. (45) Date of Patent: Jul. 28, 2026

(54) METHODS AND APPARATUS FOR DIRECTIONAL CHANNEL SENSING FOR BEAMFORMED TRANSMISSIONS

(71) Applicant: Huawei Technologies Co., Ltd., Shenzhen (CN)

(72) Inventors: Narayan Prasad, Westfield, NJ (US); Weimin Xiao, Hoffman Estates, IL (US); George Calcev, Hoffman Estates, IL (US); Qian Cheng, Naperville, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 311 days.

(21) Appl. No.: 18/501,415

(22) Filed: Nov. 3, 2023

(65) Prior Publication Data
US 2024/0090026 A1 Mar. 14, 2024

Related U.S. Application Data

(63) Continuation of application No. PCT/US2022/028108, filed on May 6, 2022.

(60) Provisional application No. 63/186,622, filed on May 10, 2021.

(51) Int. Cl.
*H04W 74/0808* (2024.01)
*H04B 7/06* (2006.01)
*H04B 7/08* (2006.01)

(52) U.S. Cl.
CPC .... *H04W 74/0808* (2013.01); *H04B 7/06952* (2023.05); *H04B 7/088* (2013.01)

(58) Field of Classification Search
CPC .... H04B 7/088; H04B 7/0617; H04B 7/0695; H04W 16/28; H04W 74/08; H04W 74/0808; H04W 74/0816; H04W 74/0866
USPC ........................................ 370/252, 277, 329
See application file for complete search history.

(56) References Cited

U.S. PATENT DOCUMENTS

2022/0322435 A1* 10/2022 Chisci ................... H04W 16/28
2025/0080183 A1* 3/2025 Chisci ................. H04B 7/0617

OTHER PUBLICATIONS

CATT:"Channel access mechanism for up to 71GHz operation." R1-2102626. 3GPP TSG RAN WG1 Meeting #104b-e e-Meeting, Apr. 12-Apr. 20, 2021. total 9 pages.
(Continued)

*Primary Examiner* — Harun Chowdhury
(74) *Attorney, Agent, or Firm* — Slater Matsil, LLP

(57) ABSTRACT

According to various embodiments, a wireless communication device divides a plurality of transmission beams into one or more groups of transmission beams including at least a first group of transmission beams. The wireless communication device determines a first sensing beam requirement for the first group of transmission beams. The wireless communication device determines a first sensing beam and a first scale factor so that the first sensing beam satisfies the first sensing beam requirement scaled by the first scale factor. The first sensing beam is selected from a set of candidate sensing beams. The wireless communication device performs a first Clear Channel Assessment (CCA) using the first sensing beam and a first energy detection threshold (EDT), the first EDT determined in accordance with the first scale factor.

23 Claims, 18 Drawing Sheets

(56) References Cited

OTHER PUBLICATIONS

LG Electronics:"Considerations on channel access mechanism to support NR above 52.6 GHz." R1-2103345. 3GPP TSG RAN WG1 #104b-e e-Meeting, Apr. 12-20, 2021.total 12 pages.
Futurewei, "Channel access for shared spectrum Beyond 52.6 GHz", 3GPP TSG RAN WG1 Meeting #105-e, R1-2104213, May 19-27, 2021, 10 Pages, e-Meeting.
Nokia, et al., "Channel access mechanism", 3GPP TSG RAN WG1 #104-e, R1-2100262, Jan. 25-Feb. 5, 2021, 14 Pages, e-Meeting.
Qualcomm Incorporated, "Channel Access Mechanisms for NR in 52.6 to 71GHz band", 3GPP TSG RAN WG1 Meeting #104-e, R1-2101458, Jan. 25-Feb. 5, 2021, 8 Pages.
"3rd Generation Partnership Project; Technical Specification Group Radio Access Network; Physical layer procedures for shared spectrum channel access (Release 16)," 3GPP TS 37.213 V16.0.0, Dec. 2019, 25 pages.

* cited by examiner (>=20μs;
THRESHOLD
-73dBm/MHz+
(23-maxEIRP))

400

CCA

CCA

UUT CCA

UUT
TRANSMISSIONS

IDLE PERIOD
(> = 5%
OCCUPANCY
AND 50μs)

CHANNEL OCCUPANCY TIME (1~10ms)

FIXED FRAME PERIOD

1500

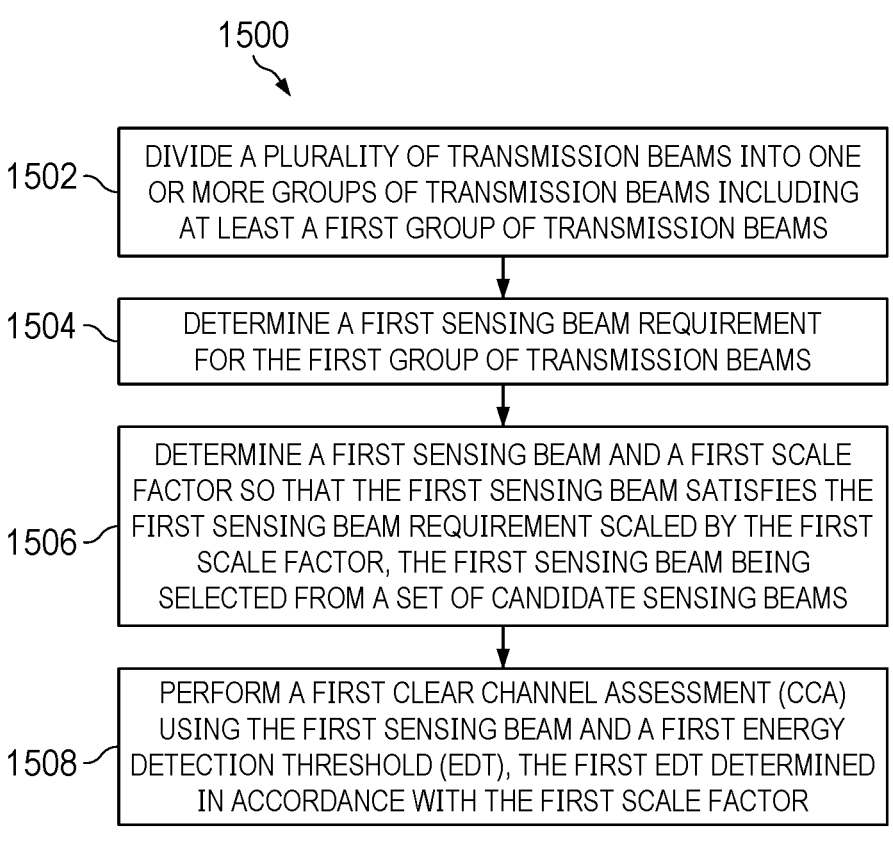

1502 — DIVIDE A PLURALITY OF TRANSMISSION BEAMS INTO ONE OR MORE GROUPS OF TRANSMISSION BEAMS INCLUDING AT LEAST A FIRST GROUP OF TRANSMISSION BEAMS

1504 — DETERMINE A FIRST SENSING BEAM REQUIREMENT FOR THE FIRST GROUP OF TRANSMISSION BEAMS

1506 — DETERMINE A FIRST SENSING BEAM AND A FIRST SCALE FACTOR SO THAT THE FIRST SENSING BEAM SATISFIES THE FIRST SENSING BEAM REQUIREMENT SCALED BY THE FIRST SCALE FACTOR, THE FIRST SENSING BEAM BEING SELECTED FROM A SET OF CANDIDATE SENSING BEAMS

1508 — PERFORM A FIRST CLEAR CHANNEL ASSESSMENT (CCA) USING THE FIRST SENSING BEAM AND A FIRST ENERGY DETECTION THRESHOLD (EDT), THE FIRST EDT DETERMINED IN ACCORDANCE WITH THE FIRST SCALE FACTOR

FIG. 15A

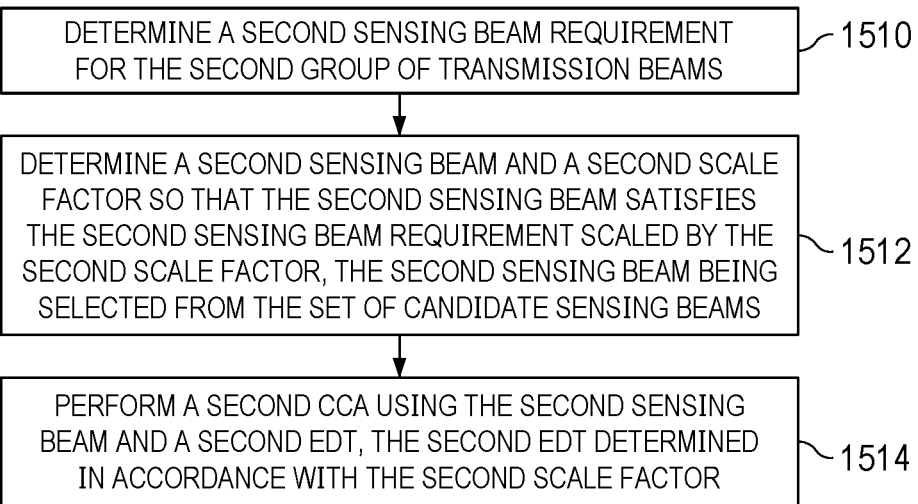

DETERMINE A SECOND SENSING BEAM REQUIREMENT FOR THE SECOND GROUP OF TRANSMISSION BEAMS — 1510

DETERMINE A SECOND SENSING BEAM AND A SECOND SCALE FACTOR SO THAT THE SECOND SENSING BEAM SATISFIES THE SECOND SENSING BEAM REQUIREMENT SCALED BY THE SECOND SCALE FACTOR, THE SECOND SENSING BEAM BEING SELECTED FROM THE SET OF CANDIDATE SENSING BEAMS — 1512

PERFORM A SECOND CCA USING THE SECOND SENSING BEAM AND A SECOND EDT, THE SECOND EDT DETERMINED IN ACCORDANCE WITH THE SECOND SCALE FACTOR — 1514

FIG. 15B

METHODS AND APPARATUS FOR DIRECTIONAL CHANNEL SENSING FOR BEAMFORMED TRANSMISSIONS

CROSS-REFERENCE TO RELATED APPLICATIONS

This application is a continuation of International Patent Application No. PCT/US2022/028108, filed May 6, 2022 and entitled "Methods and Apparatus for Directional Channel Sensing for Beamformed Transmissions," which claims the benefit of U.S. Provisional Application No. 63/186,622, filed on May 10, 2021 and entitled "Methods and Apparatus for Directional Channel Sensing for Beamformed Transmissions," applications of which are hereby incorporated herein by reference in their entireties.

TECHNICAL FIELD

The present disclosure relates generally to systems and methods for channel sensing, and, in particular embodiments, to systems and methods for directional channel sensing for beamformed transmissions.

BACKGROUND

Third Generation Partnership Project (3GPP) and Institute of Electrical and Electronics Engineers (IEEE) technologies operating in unlicensed spectrum use Listen Before Talk (LBT) channel access. In certain regions such European Union and Japan, the LBT rule may be enforced by the spectrum regulators to reduce the interference risk and to offer a fair coexistence mechanism. The LBT mechanism may require the transmitter to check before a transmission if there are other occupants of a channel and postpone the transmission if the channel is occupied.

In shared spectrum access in Beyond 52.6 GHz, due to the higher carrier frequency (and hence smaller wavelengths) than the maximal frequency in frequency range (FR) 2, it becomes possible to pack more antenna elements in the same form factor. This allows for realizing finer (narrower) beams. Improved beamforming gain may be beneficial in mitigating more adverse path-loss at these higher frequencies. Therefore, directional LBT techniques for beamformed transmissions are desired.

SUMMARY

According to various embodiments, a wireless communication device divides a plurality of transmission beams into one or more groups of transmission beams including at least a first group of transmission beams. The wireless communication device determines a first sensing beam requirement for the first group of transmission beams. The wireless communication device determines a first sensing beam and a first scale factor so that the first sensing beam satisfies the first sensing beam requirement scaled by the first scale factor. The first sensing beam is selected from a set of candidate sensing beams. The wireless communication device performs a first Clear Channel Assessment (CCA) using the first sensing beam and a first energy detection threshold (EDT), the first EDT determined in accordance with the first scale factor.

In some embodiments, the first sensing beam requirement may be that an X dB beamwidth of the first sensing beam includes each direction belonging to a Y dB beamwidth of the first group of transmission beams, wherein X and Y are configurable parameters. In some embodiments, the first sensing beam requirement may be that a gain of the first sensing beam measured in a direction is larger than a threshold, wherein the direction is determined in accordance with the first group of transmission beams, and wherein the threshold is determined in accordance with the first sensing beam and the first group of transmission beams. In some embodiments, the wireless communication device may determine a Max-hold Effective Isotropic Radiated Power (EIRP), wherein the Max-hold EIRP is a pointwise maximum of EIRPs of the first group of transmission beams. In some embodiments, the direction may be a peak direction of the Max-hold EIRP, and the threshold may be X dB of a peak of the Max-hold EIRP, wherein X is a configurable parameter. In some embodiments, the direction may be determined such that the Max-hold EIRP measured in the direction is larger than X dB of a peak of the Max-hold EIRP, wherein the threshold is Y dB of the Max-hold EIRP measured in the direction, and wherein X and Y are configurable parameters. In some embodiments, the direction may be determined such that the Max-hold EIRP measured in the direction is larger than X dB of a peak of the Max-hold EIRP, wherein the threshold is Y dB of a peak gain of the first sensing beam, and wherein X and Y are configurable parameters. In some embodiments, the wireless communication device may determine a composite transmit angular power profile (APP), wherein the composite transmit APP is an envelope of APPs of the first group of transmission beams, wherein the direction is determined such that the composite transmit APP measured in the direction is larger than X dB of a peak of the composite transmit APP, wherein the threshold is Y dB of the composite transmit APP measured in the direction divided by the peak of the composite transmit APP, and wherein X and Y are configurable parameters. In some embodiments, in response to no sensing beam in the set of candidate sensing beams satisfying the first sensing beam requirement, the first sensing beam requirement scaled by the first scale factor may be that the gain of the first sensing beam measured in the direction is larger than the threshold multiplied by the first scale factor. In some embodiments, the first scale factor may be a largest positive value such that at least one sensing beam in the set of candidate sensing beams satisfies the first sensing beam requirement scaled by the first scale factor, wherein the first sensing beam is selected from the at least one sensing beam. In some embodiments, in response to at least one sensing beam in the set of candidate sensing beams satisfying the first sensing beam requirement, the first sensing beam requirement scaled by the first scale factor may be the same as the first sensing beam requirement, wherein the first scale factor is 1, and wherein the first sensing beam is selected from the at least one sensing beam. In some embodiments, the one or more groups of transmission beams may further include a second group of transmission beams. The wireless communication device may determine a second sensing beam requirement for the second group of transmission beams. The wireless communication device may determine a second sensing beam and a second scale factor so that the second sensing beam satisfies the second sensing beam requirement scaled by the second scale factor, wherein the second sensing beam is selected from the set of candidate sensing beams. The wireless communication device may perform a second CCA using the second sensing beam and a second EDT, wherein the second EDT is determined in accordance with the second scale factor.

BRIEF DESCRIPTION OF THE DRAWINGS

For a more complete understanding of the present disclosure, and the advantages thereof, reference is now made to the following descriptions taken in conjunction with the accompanying drawings, in which:

FIGS. 15A-15B illustrate an embodiment method for directional channel sensing and additional steps;

DETAILED DESCRIPTION OF ILLUSTRATIVE EMBODIMENTS

Figure 1:
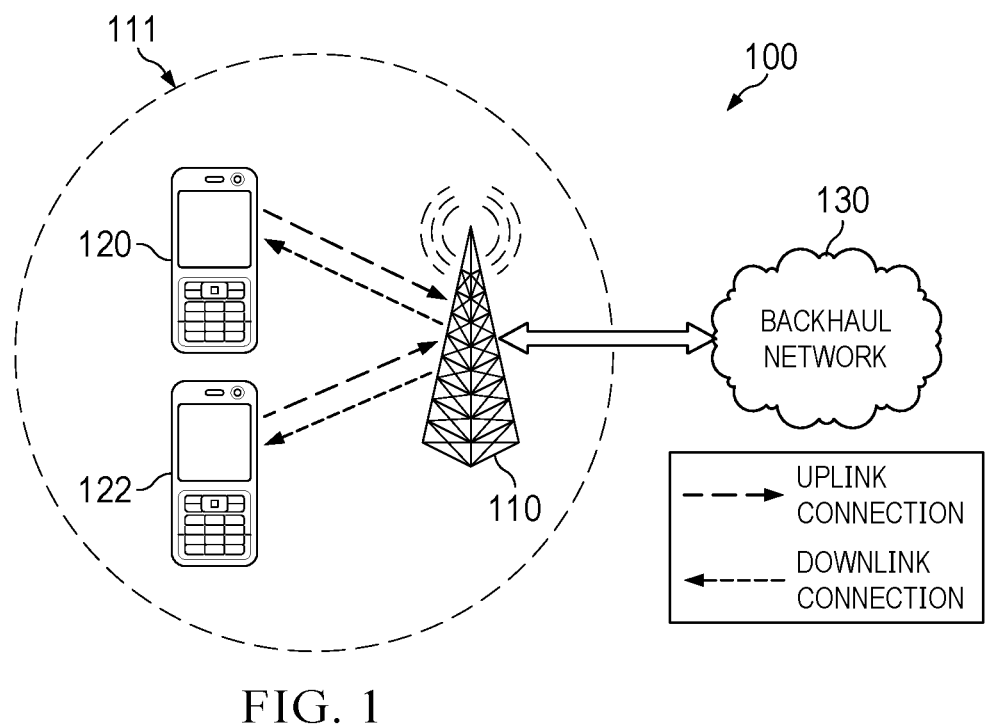
FIG. 1 illustrates an example wireless communication system.

In LBT channel access, a transmitter or initiating node may use a Clear Channel Assessment (CCA) to determine if a channel is available for transmission. During the CCA, the transmitter or initiating node may use a sensing beam to measure if energy received on the channel is above a threshold. If the energy detected exceeds an energy detection threshold (EDT), the channel is considered in use (busy), otherwise is considered idle. If the channel is idle, the transmitter can transmit for a duration of channel occupancy time (COT) using a transmission beam. The transmission beam may be directional or narrow. If a wider beam pattern or quasi-omni beam pattern is used as the sensing beam, there could be an over-protection issue. In this issue, an ongoing transmission may not interfere with the intended transmission beam because the transmission beam is directional. But the transmitter may still detect the ongoing transmission using the quasi-omni sensing beam and thus consider the channel as busy.

A directional sensing beam that is aligned with the intended transmission beam will solve the over-protection issue. In other words, the initiating node or transmitter may perform channel sensing in the directions where it intends to transmit. However, multiple transmission beams are usually employed in beamformed transmissions. The transmitter may not have a sensing beam that perfectly matches a pattern of each transmission beam due to limitation on the transmitter's capacity. Accordingly, techniques for selecting an appropriate sensing beam to enforce sufficient sensing gain along directions of multiple transmission beams are desired.

Aspects of this disclosure provide embodiment techniques that divide a set of intended transmission beams into multiple beam groups or beam clusters. Channel sensing will be performed on a per group basis. Different feasibility requirements that allow a sensing beam to cover transmission beams in a group are provided in various embodiments. The feasibility requirements may be scaled by a scale factor to compensate shortcomings of the sensing beam if the sensing beam has an insufficient sensing gain in some directions. For each group of transmission beams, a sensing beam may be determined in accordance with one of these requirements. Furthermore, aspects of this disclosure also allow the transmitter to perform channel sensing using a separate EDT for each group. The separate EDT may be adjusted by the scale factor. The above aspects and other inventive aspects are discussed in greater detail below.

Licensed exempt spectrum, also known as unlicensed spectrum, attracted a lot of interest from cellular operators in the last years. Long-Term Evolution (LTE) Licensed-Assisted Access (LAA) was specified in 3GPP LTE releases 13 and 14. More recently in 5G New Radio Unlicensed (NR-U), the operation in unlicensed spectrum (shared spectrum) was specified in Release 16 (TS 38.213, which is hereby incorporated herein by reference in its entirety). In shared spectrum access in Beyond 52.6 GHz, due to the higher carrier frequency (and hence smaller wavelengths) than the maximal frequency in FR2, it becomes possible to pack more antenna elements in the same form factor. This allows for realizing finer (narrower) beams. Improved beamforming gain may be crucial in mitigating the more adverse path-loss at these higher frequencies.

3GPP and IEEE technologies operating in unlicensed spectrum use Listen Before Talk (LBT) channel access. In certain regions such European Union and Japan, the LBT rule may be enforced by the spectrum regulators to reduce the interference risk and to offer a fair coexistence mechanism. The LBT mechanism may require the transmitter to check before a transmission if there are other occupants of the channel and postpone the transmission if the channel is occupied.

In particular, the LBT rule in EU specified in ETSI EN 301893 for 5 GHz band uses Clear Channel Assessment (CCA) to determine if the channel is available for transmission. CCA checks if the energy received is above a threshold. If the energy detected exceeds the CCA threshold, the channel is considered in use (busy), otherwise is considered idle. If the channel is idle, the transmitter can transmit for a duration of channel occupancy time (COT) at a bandwidth (e.g., at least 80% of the total channel bandwidth). The maximum COT duration for a transmission burst is also specified in ETSI EN 301893. The maximum COT (MCOT) duration adopted in 3GPP NR-U Rel 16 [TS 37.213] is a function of channel access priority class (CAPC). As defined in TS 37.213, for determining a Channel Occupancy Time, if a transmission gap is less than or equal to 25 us, the gap duration is counted in the channel occupancy time. A transmission burst is defined as a set of transmissions with gaps no more than 16 us; if the gaps are larger than 16 us, the transmissions are considered separate.

3GPP Rel-16 [TS 37.213] defines several types of channel access for downlink (DL) and respectively uplink (UL).

In Type 1 DL channel access, the gNB may transmit after first sensing the channel to be idle during the sensing slot durations of a defer duration $T_d$ and after the random initiated counter N and decremented in each idle sensing slot is zero. A sensing slot duration is 9 us. Type 1 DL channel access is used before starting a new COT, where the COT duration can be up to 10 ms depending of traffic priority.

Type 2 DL channel access consists of a deterministic duration of channel sensing where the channel needs to be sensed as idle.

Type 2A channel access allows a transmission if the channel is sensed idle for a least sensing interval of 25 us prior to transmission.

Type 2B channel access allows a transmission if the channel is sensed idle for a least sensing interval of 16 us prior to transmission.

Type 2C channel access allows a transmission for a duration of no more than 584 us without channel sensing prior to transmission.

Type 2A DL channel access procedures are applicable in shared COT following a UE transmission and for transmissions that consist of discovery burst with duration of most 1 ms and duty cycle at most ½0.

Type 2B or Type 2C DL channel access procedures are applicable following transmission(s) by a UE after a gap of 16 us or up to 16 us, respectively, in a shared channel occupancy.

Similarly with DL access channel types, TS 37.213 defines UL channel access procedures, where Type 1 UL access is based on sensing channel idle for a defer duration Td and random backoff counter N as in Type 1A DL, Type 2 UL consists of deterministic duration idle channel before transmissions, Type 2A UL of at least 25 us channel idle, Type 2B UL of at least 16 us channel idle, and Type 2C no sensing for transmissions of at most 584 us.

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

FIG. 1 illustrates an example wireless communication system 100. Communication system 100 includes an access node 110 with coverage area 11. Access node 110 serves a plurality of user equipments (UEs), including UE 120 and UE 122. Transmissions from access node 110 to a UE is referred to as a downlink (DL) transmission and occurs over a downlink channel (shown in FIG. 1 as a solid arrowed line), while transmissions from a UE to access node 110 is referred to as an uplink (UL) transmission and occurs over an uplink channel (shown in FIG. 1 as a dashed arrowed line). Services may be provided to the plurality of UEs by service providers connected to access node 110 through a backhaul network 130, such as the Internet. The wireless communication system 100 may include multiple distributed access nodes 110.

In a typical communications system, there are several operating modes. In a cellular operating mode, communications to and from the plurality of UEs go through access node 110, while in device to device communications mode, such as proximity services (ProSe) operating mode, for example, direct communication between UEs is possible. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, relays, customer premises equipment (CPE), and so on. UEs may also be commonly referred to as mobile stations, mobiles, terminals, users, subscribers, stations, communication devices, CPEs, relays, Integrated Access and Backhaul (JAB) relays, and the like. It is noted that when relaying is used (based on relays, picos, CPEs, and so on), especially multihop relaying, the boundary between a controller and node controlled by the controller may become blurry, and a dual node (either the controller or the node controlled by the controller) deployment where a first node that provides configuration or control information to a second node is considered to be the controller. Likewise, the concept of UL and DL transmissions can be extended as well.

A cell may include one or more bandwidth parts (BWPs) for UL or DL allocated for a UE. Each BWP may have its own BWP-specific numerology and configuration. It is noted that not all BWPs need to be active at the same time for the UE. A cell may correspond to one or more carriers. Typically, one cell (a primary cell (PCell) or a secondary cell (SCell), for example) is a component carrier (a primary component carrier (PCC) or a secondary CC (SCC), for example). For some cells, each cell may include multiple carriers in UL, one carrier is referred to as an UL carrier or non-supplementary UL (non-SUL) UL carrier which has an associated DL, and other carriers are called a supplementary UL (SUL) carriers which do not have an associated DL. A cell, or a carrier, may be configured with slot or subframe formats comprised of DL and UL symbols, and that cell or carrier is seen as operating in time division duplexed (TDD) mode. In general, for unpaired spectrum, the cells or carriers are in TDD mode, and for paired spectrum, the cells or carrier are in a frequency division duplexed (FDD) mode. Access nodes may provide wireless access in accordance with one or more wireless communication protocols, e.g., long term evolution (LTE), LTE advanced (LTE-A), 5G, 5G LTE, 5G NR, High Speed Packet Access (HSPA), Wi-Fi 802.na/b/g/n/ac, etc. While it is understood that communications systems may employ multiple access nodes capable of communicating with a number of UEs, only one access node, and two UEs are illustrated for simplicity.

Figure 2:
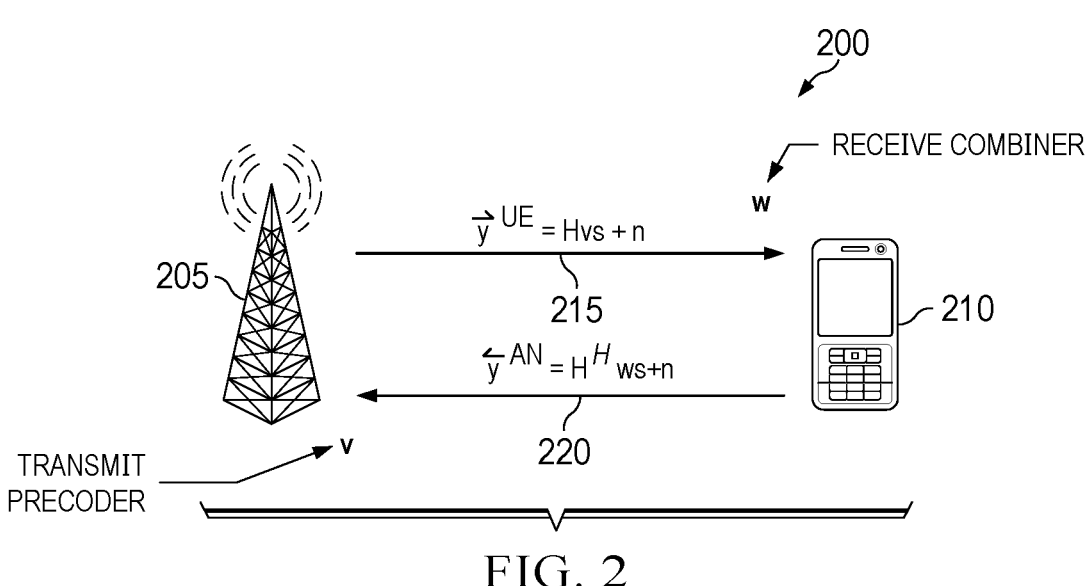
FIG. 2 illustrates an example communications system.

FIG. 2 illustrates an example communications system 200, providing mathematical expressions of signals transmitted in the communications system. Communications system 200 includes an access node 205 communicating with a UE 210. As shown in FIG. 2, access node 205 is using a transmit filter v and UE 210 is using a receive filter w. Both access node 205 and UE 210 use linear precoding or combining. Assuming H is $N_{rx} \times N_{tx}$ matrix of a multiple-input multiple-output (MIMO) system, i.e., there are $N_{tx}$ transmit antennas and $N_x$ receive antennas. The transmit filter v of dimension $N_{tx} \times Ns$ enables the transmitter to precode or beamform the transmitted signal, where Ns is the number of layers, ports, streams, symbols, pilots, messages, data, or known sequences transmitted. The receive filter w of multi-antenna systems is of dimension $N_{rx} \times Ns$ and represents the combining matrix, which is usually applied on the received signal y according to $w^H y$. The above description is for a transmission from access node 205 to UE 210, i.e., a DL transmission. The transmission may also occur at the reverse direction (an UL transmission), for which the channel matrix becomes $H^H$ in the case of TDD (where $H^H$ is the Hermitian of channel model H), and w may be seen as the transmit filter and v as the receiver filter. The w for transmission and the w for reception may or may not be the same, and likewise for v.

A DL (or forward) channel 215 between access node 205 and UE 210 has channel model or response H, while an UL (or backward, or reverse) channel 220 between UE 210 and access node 205 has channel model or response $H^H$. (Another convention is that the UL channel is denoted as $H^T$, which is the transposition of channel model H.) Although FIG. 2 depicts only one access node and one UE, communication system 200 is not limited to this case. Multiple UEs may be served by the access node, on different time-frequency resources (such as in frequency division multiplexed-time division multiplexed (FDM-TDM) communication systems, as in typical cellular systems) or on the same time-frequency resources (such as in multi-user MIMO (MU-MIMO) communication systems, wherein multiple UEs are paired together and transmissions to each UE are individually precoded). Among the paired UEs, there is intra-cell interference.

Also multiple access nodes may exist in the network, some of which may be cooperatively serving UE 210 in a joint transmission fashion (such as in coherent joint transmission, non-coherent joint transmission, coordinated multipoint transmission, etc.), a dynamic point switching fashion, and so on. Some other access nodes may not serve UE 210 and their transmissions to their own UEs cause inter-cell interference to UE 210. The scenario of multiple access nodes and multiple UEs, with access node cooperation to serve a UE and with MU-MIMO, is a scenario considered herein.

One way to increase the network resources is to utilize more and more usable spectrum resources, which include not only the licensed spectrum resources of the same type as the macro, but also the licensed spectrum resources of different type as the macro (e.g., the macro is a FDD cell but a small cell may use both FDD and TDD carriers), as well as unlicensed spectrum resources and shared-licensed spectrums; some of the spectrum resources lie in high-frequency bands, such as 6 GHz to 60 GHz. The unlicensed spectrums can be used by generally any user, subject to regulation requirements. The shared-licensed spectrums are also not exclusive for an operator to use. Traditionally the unlicensed spectrums are not used by cellular networks as it is generally difficult to ensure quality of service (QoS) requirements. Operating on the unlicensed spectrums mainly include wireless local area networks (WLAN), e.g. the Wi-Fi networks. Due to the fact that the licensed spectrum is generally scarce and expensive, utilizing the unlicensed spectrum by the cellular operator may be considered. Note that on high-frequency bands and unlicensed/shared-licensed bands, typically TDD is used and hence the channel reciprocity can be exploited for the communications.

On unlicensed spectrum, generally there is no pre-coordination among multiple nodes operating on the same frequency resources. Thus, a contention-based protocol (CBP) may be used. According to Section 90.7 of Part 90 (paragraph 58) of the United States Federal Communication Commission (FCC), CBP is defined as: "A protocol that allows multiple users to share the same spectrum by defining the events that must occur when two or more transmitters attempt to simultaneously access the same channel and establishing rules by which a transmitter provides reasonable opportunities for other transmitters to operate. Such a protocol may consist of procedures for initiating new transmissions, procedures for determining the state of the channel (available or unavailable), and procedures for managing retransmissions in the event of a busy channel." The state of a channel being busy may also be called as channel unavailable, channel not clear, channel being occupied, etc., and the state of a channel being idle may also be called as channel available, channel clear, channel not occupied, etc.

One of the most used CBP is the "listen before talk" (LBT) operating procedure in IEEE 802.11 or WiFi (which can be found in, e.g., "Wireless LAN medium access control (MAC) and physical layer (PHY) specifications," IEEE Std 802.11-2007 (Revision of IEEE Std 802.11-1999)), which is hereby incorporated herein by reference. It is also known as the carrier sense multiple access with collision avoidance (CSMA/CA) protocol. Carrier sensing is performed before any transmission attempt, and the transmission is performed only if the carrier is sensed to be idle, otherwise a random backoff time for the next sensing is applied. The sensing is generally done through a clear channel assessment (CCA) procedure to determine if the in-channel power is below a given threshold.

In ETSI EN 301 893 V1.7.1, which is hereby incorporated herein by reference, Clause 4.9.2, it describes 2 types of Adaptive equipment: Frame Based Equipment and Load Based Equipment. To quote the specification:

"Frame Based Equipment shall comply with the following requirements:

"1) Before starting transmissions on an Operating Channel, the equipment shall perform a Clear Channel Assessment (CCA) check using "energy detect". The equipment shall observe the Operating Channel(s) for the duration of the CCA observation time which shall be not less than 20 μs. The CCA observation time used by the equipment shall be declared by the manufacturer. The Operating Channel shall be considered occupied if the energy level in the channel exceeds the threshold corresponding to the power level given in point 5 below. If the equipment finds the Operating Channel(s) to be clear, it may transmit immediately (see point 3 below).

"2) If the equipment finds an Operating Channel occupied, it shall not transmit on that channel during the next Fixed Frame Period.

"NOTE 1: The equipment is allowed to continue Short Control Signalling Transmissions on this channel providing it complies with the requirements in clause 4.9.2.3.

"NOTE 2: For equipment having simultaneous transmissions on multiple (adjacent or non-adjacent) Operating Channels, the equipment is allowed to continue transmissions on other Operating Channels providing the CCA check did not detect any signals on those channels.

"3) The total time during which an equipment has transmissions on a given channel without re-evaluating the availability of that channel, is defined as the Channel Occupancy Time. The Channel Occupancy Time shall be in the range 1 ms to 10 ms and the minimum Idle Period shall be at least 5% of the Channel Occupancy Time used by the equipment for the current Fixed Frame Period. Towards the end of the Idle Period, the equipment shall perform a new CCA as described in point 1 above.

"4) The equipment, upon correct reception of a packet which was intended for this equipment, can skip CCA and immediately (see note 3) proceed with the transmission of management and control frames (e.g. ACK and Block ACK frames). A consecutive sequence of such transmissions by the equipment, without it performing a new CCA, shall not exceed the Maximum Channel Occupancy Time as defined in point 3 above.

"NOTE 3: For the purpose of multi-cast, the ACK transmissions (associated with the same data packet) of the individual devices are allowed to take place in a sequence.

"5) The energy detection threshold for the CCA shall be proportional to the maximum transmit power (PH) of the transmitter: for a 23 dBm e.i.r.p. transmitter the CCA threshold level (TL) shall be equal or lower than −73 dBm/MHz at the input to the receiver (assuming a 0 dBi receive antenna). For other transmit power levels, the CCA threshold level TL shall be calculated using the formula: TL=−73 dBm/MHz+23−PH (assuming a 0 dBi receive antenna and PH specified in dBm e.i.r.p.)."

"Load based Equipment may implement an LBT based spectrum sharing mechanism based on the Clear Channel Assessment (CCA) mode using "energy detect", as described in IEEE 802.11™-2007 [9], clauses 9 and 17, in IEEE 802.11n™-2009 [10], clauses 9, 11 and 20 providing they comply with the conformance requirements referred to in clause 4.9.3 (see note 1) (all of which are hereby incorporated herein by reference).

"NOTE 1: It is intended also to allow a mechanism based on the Clear Channel Assessment (CCA) mode using "energy detect" as described in IEEE 802.11ac™ [i.2], clauses 8, 9, 10 and 22 (which are hereby incorporated herein by reference), when this becomes available.

"Load Based Equipment not using any of the mechanisms referenced above shall comply with the following minimum set of requirements:

"1) Before a transmission or a burst of transmissions on an Operating Channel, the equipment shall perform a Clear Channel Assessment (CCA) check using "energy detect". The equipment shall observe the Operating Channel(s) for the duration of the CCA observation time which shall be not less than 20 μs. The CCA observation time used by the equipment shall be declared by the manufacturer. The Operating Channel shall be considered occupied if the energy level in the channel exceeds the threshold corresponding to the power level given in point 5 below. If the equipment finds the channel to be clear, it may transmit immediately (see point 3 below).

"2) If the equipment finds an Operating Channel occupied, it shall not transmit in that channel. The equipment shall perform an Extended CCA check in which the Operating Channel is observed for the duration of a random factor N multiplied by the CCA observation time. N defines the number of clear idle slots resulting in a total Idle Period that need to be observed before initiation of the transmission. The value of N shall be randomly selected in the range 1 . . . q every time an Extended CCA is required and the value stored in a counter. The value of q is selected by the manufacturer in the range 4 . . . 32. This selected value shall be declared by the manufacturer (see clause 5.3.1 q)). The counter is decremented every time a CCA slot is considered to be "unoccupied". When the counter reaches zero, the equipment may transmit.

"NOTE 2: The equipment is allowed to continue Short Control Signalling Transmissions on this channel providing it complies with the requirements in clause 4.9.2.3.

"NOTE 3: For equipment having simultaneous transmissions on multiple (adjacent or non-adjacent) operating channels, the equipment is allowed to continue transmissions on other Operating Channels providing the CCA check did not detect any signals on those channels.

"3) The total time that an equipment makes use of an Operating Channel is the Maximum Channel Occupancy Time which shall be less than (13/32)×q ms, with q as defined in point 2 above, after which the device shall perform the Extended CCA described in point 2 above.

"4) The equipment, upon correct reception of a packet which was intended for this equipment, can skip CCA and immediately (see note 4) proceed with the transmission of management and control frames (e.g. ACK and Block ACK frames). A consecutive sequence of transmissions by the equipment, without it performing a new CCA, shall not exceed the Maximum Channel Occupancy Time as defined in point 3 above.

"NOTE 4: For the purpose of multi-cast, the ACK transmissions (associated with the same data packet) of the individual devices are allowed to take place in a sequence.

"5) The energy detection threshold for the CCA shall be proportional to the maximum transmit power $(P_H)$ of the transmitter: for a 23 dBm e.i.r.p. transmitter the CCA threshold level (TL) shall be equal or lower than −73 dBm/MHz at the input to the receiver (assuming a 0 dBi receive antenna). For other transmit power levels, the CCA threshold level TL shall be calculated using the formula: TL=−73 dBm/MHz+23−$P_H$ (assuming a 0 dBi receive antenna and $P_H$ specified in dBm e.i.r.p.)."

Figure 3A:
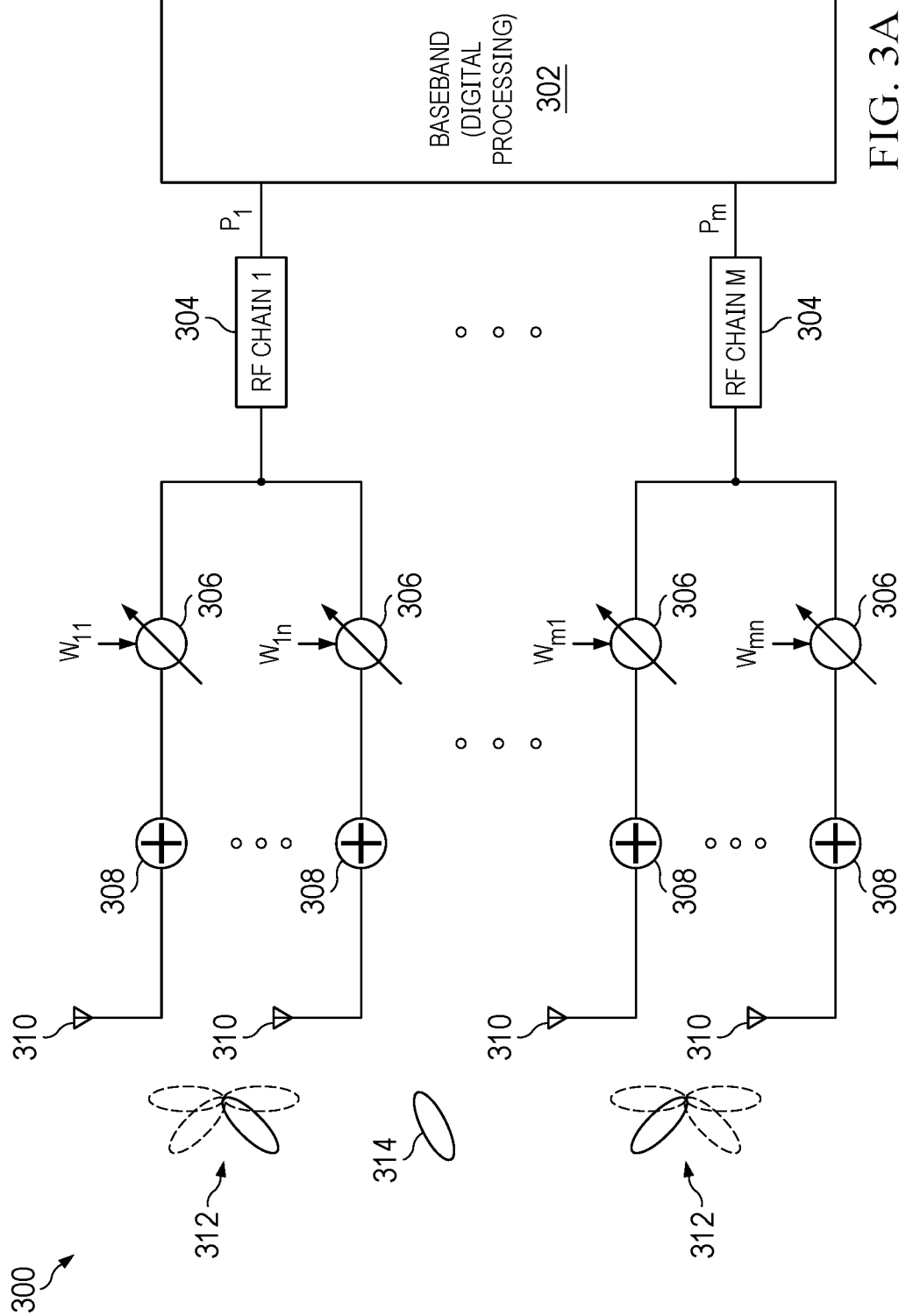
FIGS. 3A-3B illustrate block diagrams of embodiments of systems for analog beamsteering plus digital beamforming.
Figure 3B:
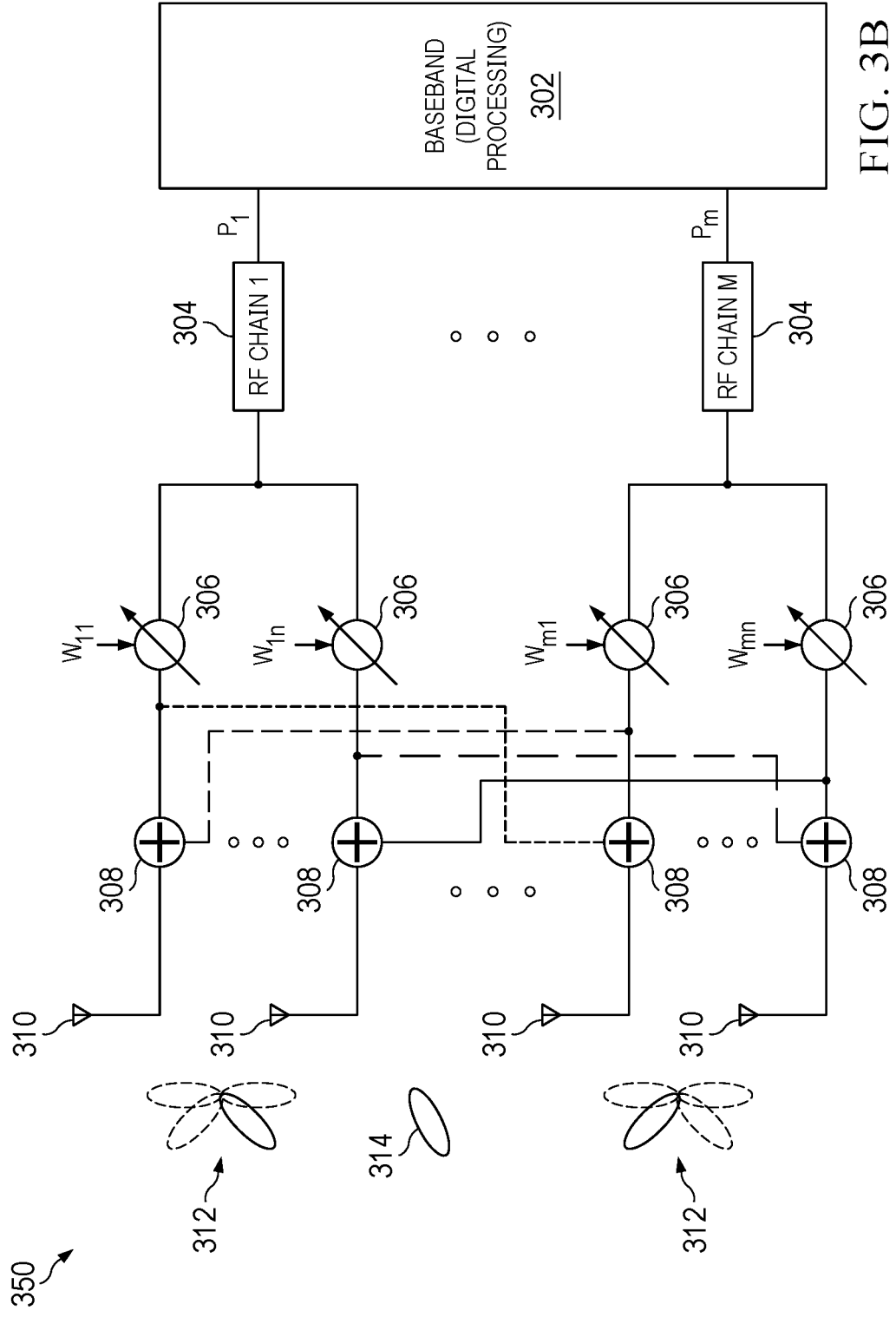

FIGS. 3A and 3B are block diagrams of embodiments of systems 300, 350 for analog beamsteering plus digital beamforming. System 300 in FIG. 3A includes a baseband component 302 for digital processing, a plurality of RF chain components 304, a plurality of phase shifters 306, a plurality of combiners 308, and a plurality of antennas 310. The diagram may be used for transmission or receiving. For simplicity, this disclosure describes the diagram assuming this is for transmission; receiving may be understood similarly. Each RF chain 304 receives a weighting factor (or weight, $p_1, \ldots, p_m$ as shown in the figure) from the baseband component 302. The collection of the weighting factors forms the digital precoding vector, precoding matrix, beamforming vector, or beamforming matrix for the transmission. For example, a precoding vector may be $[p_1, \ldots, p_m]$. When multiple layers/streams are transmitted, a precoding matrix may be used by the baseband unit to generate the weighting factors, which each column (or row) of the matrix is applied to a layer/stream of the transmission. Each RF chain 304 is coupled to a plurality of phase shifters 306. The phase shifters may, theoretically, apply any phase shift values, but generally in practice, only a few possible phase shift values, e.g., 16 or 32 values. Each RF chain 304 generates a narrow beam 312 oriented in a direction determined by the settings on the phase shifters 306 and combiners 308. If the phase shifters can apply any phase shift values, the beam may point to any direction, but if only a few phase shift values can be used, the beam may be one of few possibilities (e.g., in the figure, the solid narrow beam is selected by setting a specific phase shift value in the RF chain, and the beam is among all the possible narrow beams shown as solid and dotted beams corresponding to all the possible phase shift values). Each RF chain selects such a narrow beam, and all such narrow beams selected by all the RF chains will be further superposed. How the superposition is done is based on the digital weighting factors. The factor can make a beam from a RF chain stronger or weaker, and therefore, a different set of the factors can generate different superpositions in the spatial domain; in the figure, a particular beam 314 is illustrated. In other words, by selecting different digital weighting factors, different beam 314 can be generated. The digital operations may generally refer to as (digital) beamforming or precoding, and the analog operations as (analog) beamsteering or phase shifting, but sometimes there is no clear distinctions.

System 350 in FIG. 3B is similar to system 300 in FIG. 3A except that corresponding combiners 308 in each RF chain 302 are connected to one another.

Figure 4:
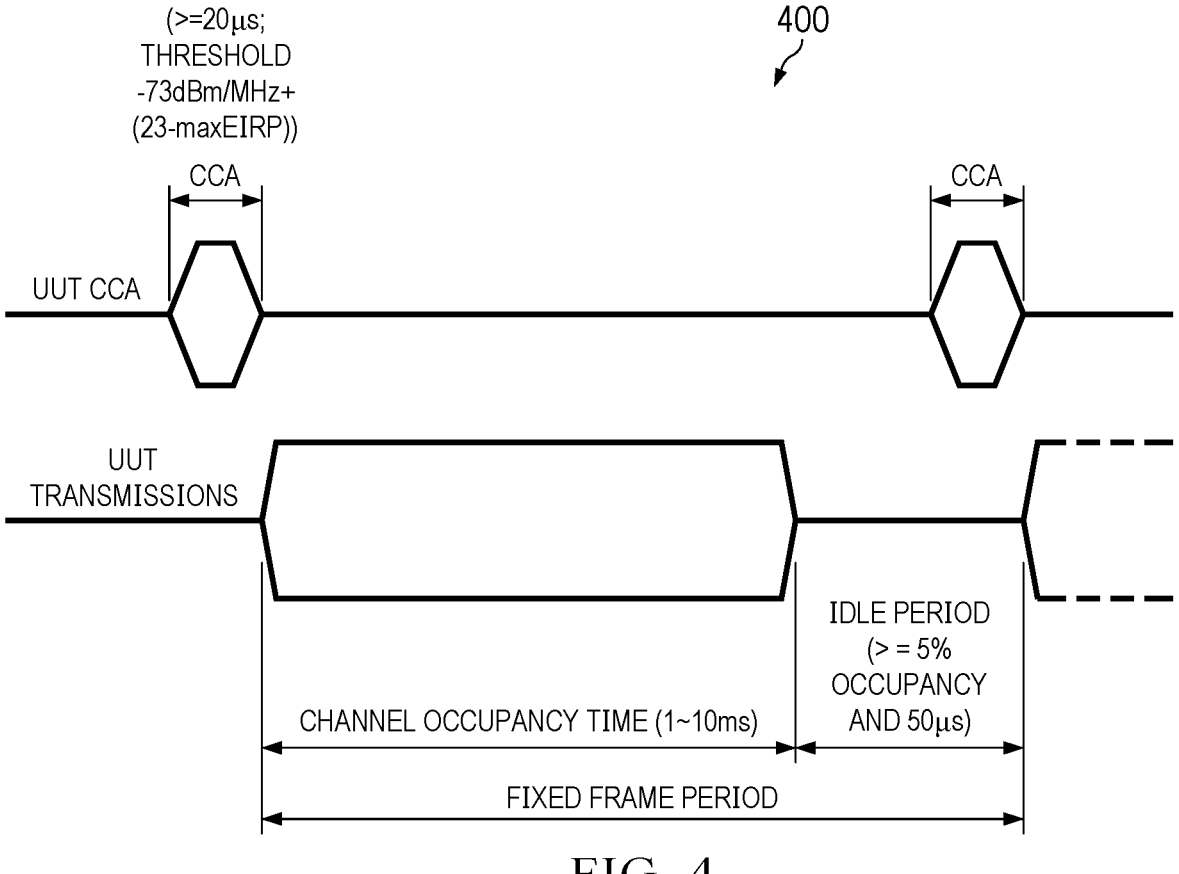
FIG. 4 illustrates an example of timing for Frame Base Equipment.

An example of timing 400 for Frame Base Equipment is illustrated in FIG. 4.

Figure 5:
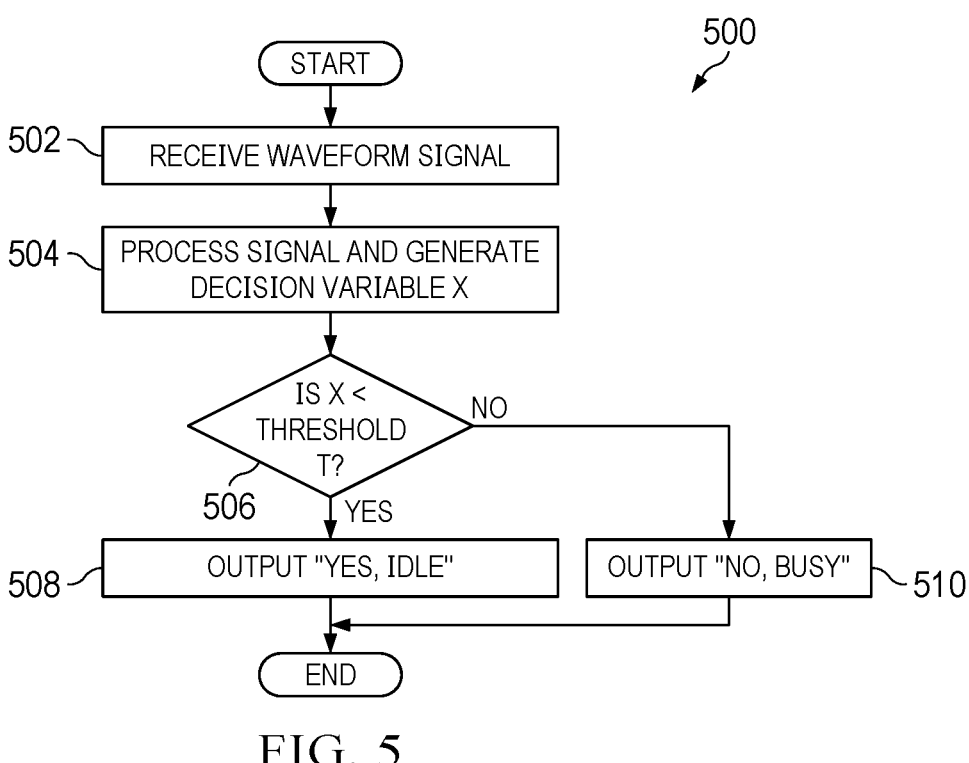
FIG. 5 illustrates an example of the flow chart for an embodiment method for carrier sensing.

An example of the flow chart for an embodiment method 500 for carrier sensing is illustrated in FIG. 5. As shown in FIG. 5, the method 500 begins at block 502 where the communication controller receives a waveform signal from a UE. At block 504, the communication controller processes the signal and generates a decision variable, X. The signal processing here, in general done in the digital domain which is normally performed in baseband, may include sampling, A/D conversion, receiver's digital combining with precoding weighting, etc. The decision variable, X, is used to determine whether the channel is idle or busy. At block 506, the communication controller determines whether the decision variable is less than a threshold, T. The threshold may be a standardized value, or derived from a standard or some regulation, which may be device type specific, spatial specific, etc. The threshold may also be allowed to change within a specified range according to the traffic loads, interference conditions, etc. If, at block 506, the communication controller determines that the value of the decision variable, X, is less than the threshold, T, the method 500 proceeds to block 508 where the communication controller determines that the carrier channel is idle, after which, the method 500 ends. If, at block 506, the communication controller determines that the value of the decision variable, X, is not less than the threshold, T, then the method 500 proceeds to block 510 where the communication controller determines that the carrier channel is busy, after which, the method 500 ends.

Figure 6:
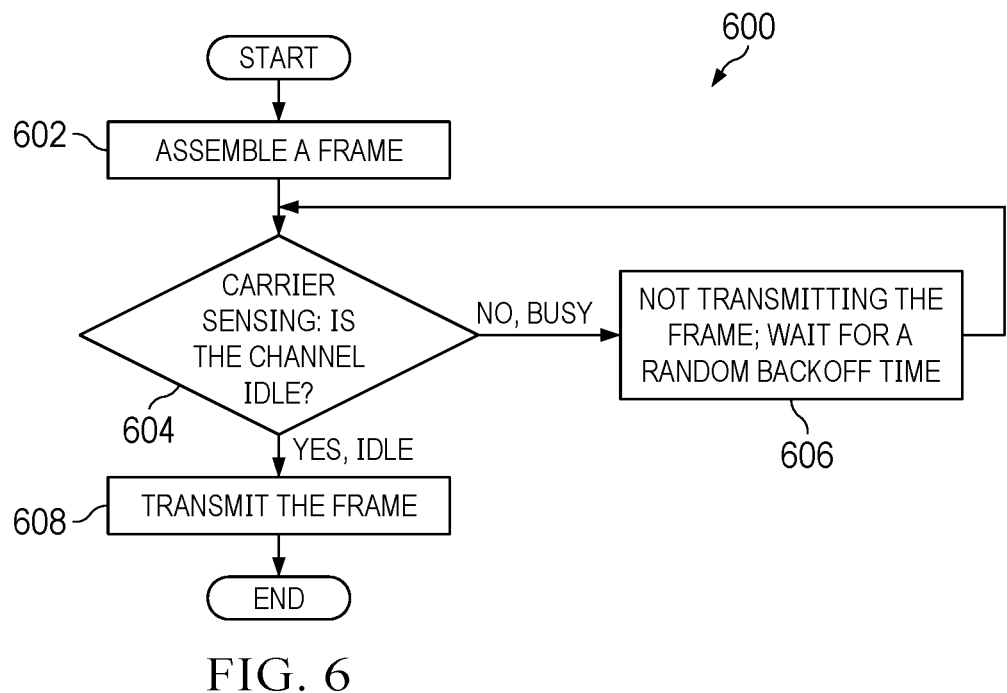
FIG. 6 illustrates a flow chart of an embodiment method for a general listen-before-talk mechanism.

A flow chart of an embodiment method 600 for a general listen-before-talk mechanism is illustrated in FIG. 6. As shown in FIG. 6, the method 600 begins at block 602 where the communication controller assembles a frame. At block 604, the communication controller performs carrier sensing, such as described above with reference to FIG. 5, to determine if the channel is idle. If, at block 604, the communication controller determines that the channel is not idle, but is busy, then the method 600 proceeds to block 606 where the communication controller refrains from transmitting the frame and waits for a random backoff timer to expire, after which, the method returns to block 604. If, at block 604, the communication controller determines that the channel is idle, then the method 600 proceeds to block 608 where the communication controller transmits the frame, after which, the method ends.

Figure 7:
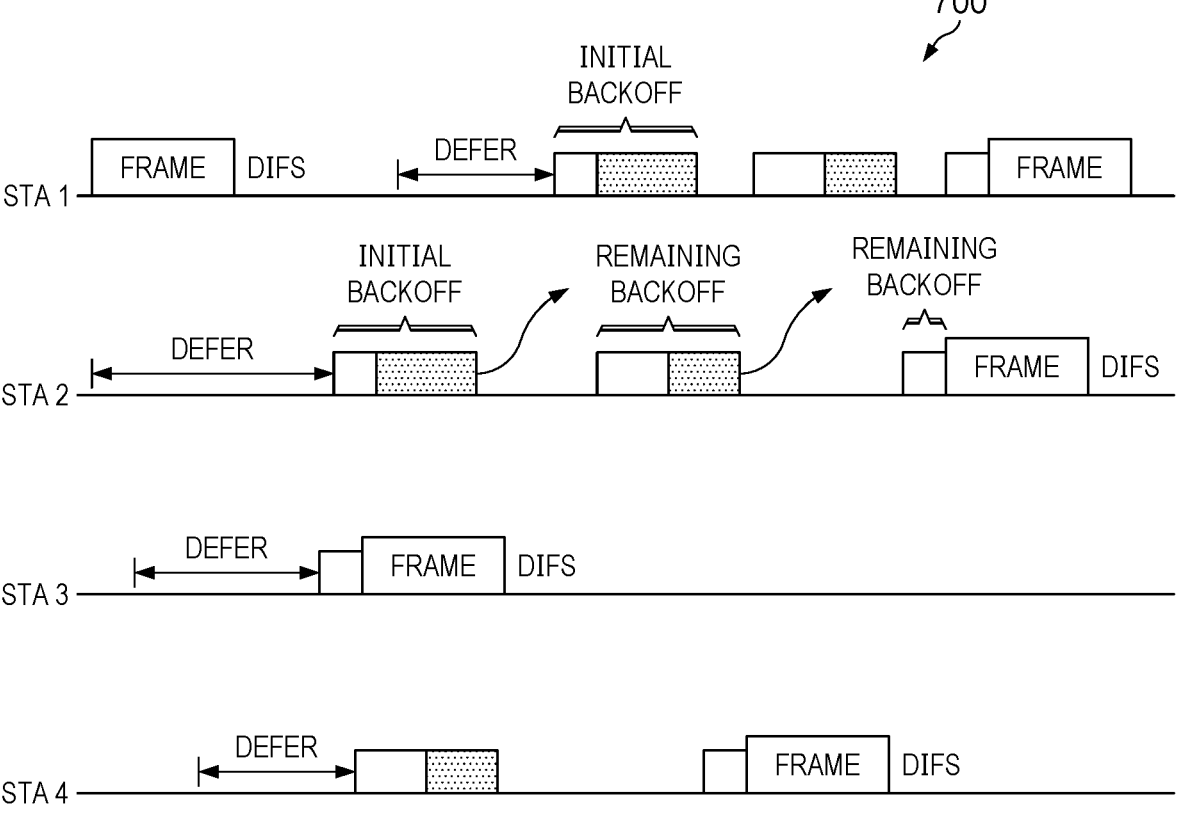
FIG. 7 illustrates an embodiment channel access procedure.

WiFi may be an eminent example of applying the listen-before-talk mechanism. WiFi uses 802.11 standards technologies such as the air interface (including physical and MAC layer). In 802.11, the communication channel is shared by stations under a mechanism called distributed channel access with a function called DCF (distributed coordination function), which uses CSMA/CA. The DCF uses both physical and virtual carrier sense functions to determine the state of the medium. The physical carrier sense resides in the PHY and uses energy detection and preamble detection with frame length deferral to determine when the medium is busy. The virtual carrier sense resides in the MAC and uses reservation information carried in the Duration field of the MAC headers announcing impeding use of the wireless channel. The virtual carrier sense mechanism is called the network allocation vector (NAV). The wireless channel is determined to be idle only when both the physical and virtual carrier sense mechanisms indicate it to be so. A station with a data frame for transmission first performs a CCA by sensing the wireless channel for a fixed duration, i.e., the DCF inter-frame space (DIFS). If the wireless channel is busy, the station waits until the channel becomes idle, defers for a DIFS, and then waits for a further random backoff period (by setting the backoff timer with an integer number of slots). The backoff timer decreases by one for every idle slot and freezes when the channel is sensed busy. When the backoff timer reaches zero, the station starts data transmission. The channel access procedure 700 is shown in FIG. 7.

To meet the regulatory requirements of operating in the unlicensed spectrum and to co-exist with other radio access technologies (RATs) such as Wi-Fi, the transmissions on the unlicensed spectrum cannot be continuous or persistent in time. Rather, on/off, or opportunistic transmissions and measurements on demand may be adopted.

Figure 8A:
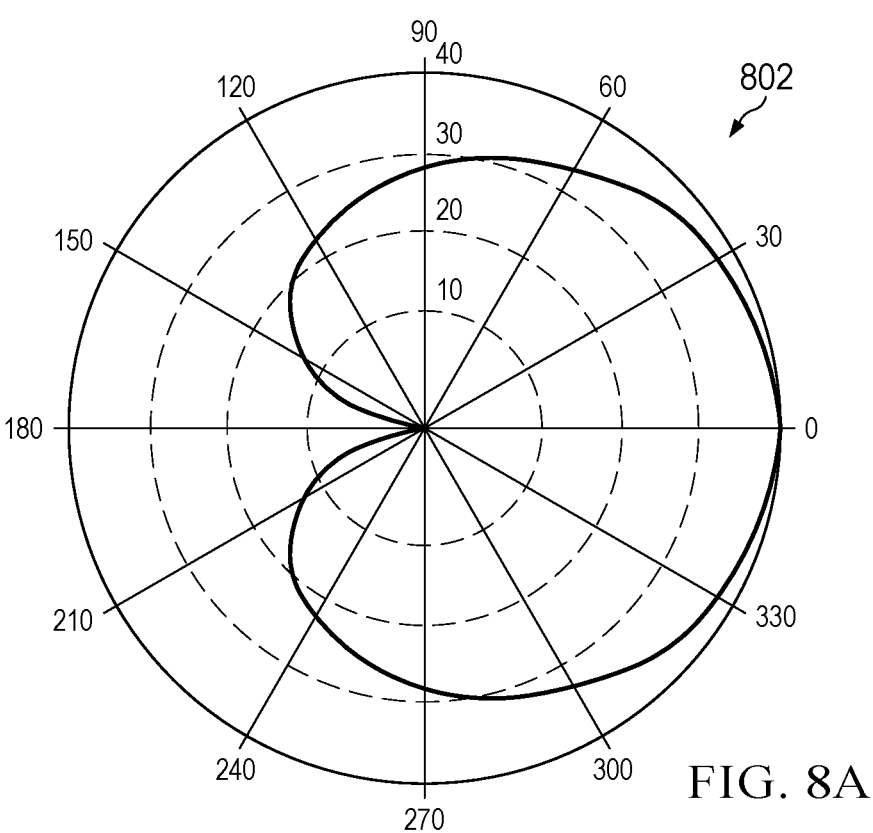
FIGS. 8A-8B illustrate an example wide beam pattern and an example narrow beam pattern.
Figure 8B:
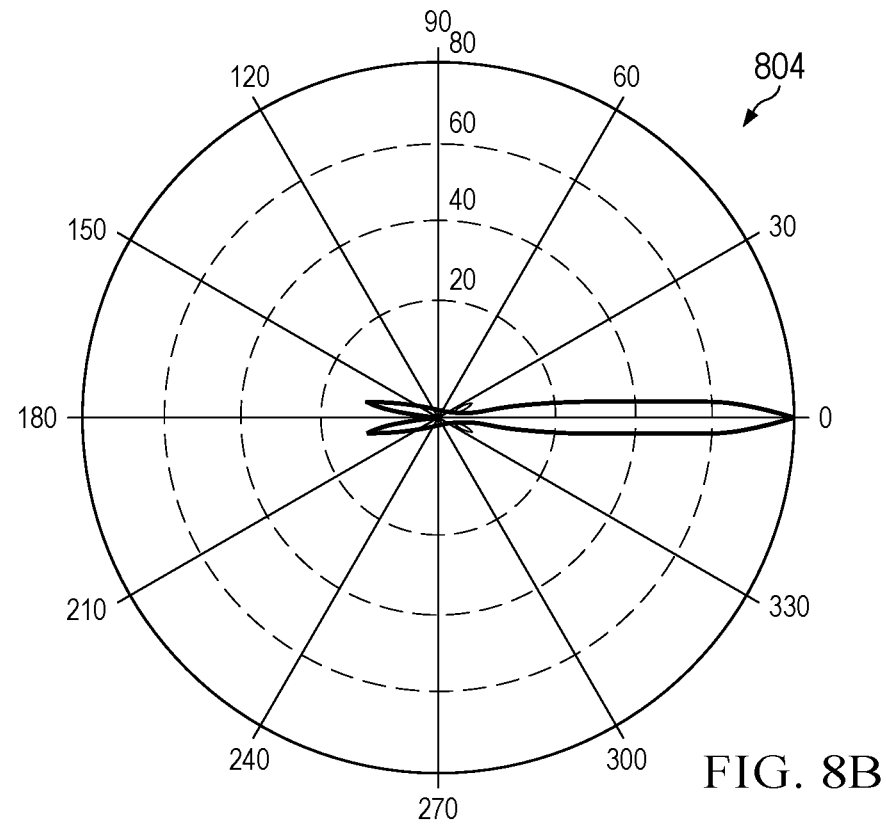

In addition, for operations in high-frequency bands, especially in the bands at 28 GHz to 60 GHz, they generally belong to the mmWave regime, which has quite different propagation characteristics from microwave (generally below 6 GHz). For example, a transmission in the mmWave regime experiences higher pathloss over distance than a transmission in the microwave regime does. Therefore, high-frequency bands are more suitable for small cell operations than macro cell operations, and they generally rely on beamforming with a large number of antennas (e.g. >16, and sometimes may be even a few hundred) for effective transmissions. Note that at high frequency, the wavelengths, antenna sizes, and antenna spacing can all be smaller than those at low frequency, thus making it feasible to equip a node with a large number of antennas. As a result, the beams formed by the large number of antennas can be very narrow, for example, with beamwidth of 10 deg or even less. In sharp contrast, in traditional wireless communications, beamwidth is generally much wider, such as tens of degrees. See FIG. 8A for an illustration of the wider beam pattern 802 with a small number of antennas in low frequency, and FIG. 8B for an illustration of the narrow beam pattern 804 with a large number of antennas in high frequency. In general, it is regarded that narrow beams are a major new feature of mmWave bands. As a general rule of thumb, the beamforming gain by massive MIMO can be roughly estimated by N×K, where N is the number of transmit antennas and K the receive antennas. This is because the 2-norm of the channel matrix H scales roughly according to $(N \times K)^{1/2}$, and therefore if the precoding vector by the transmitting node is p, and the combining vector by the receiving node is w, then the composite channel is w'Hp, and by properly selecting w and p, the composite channel gain in energy can attain N×K, much higher than the case with fewer antennas.

Figure 9:
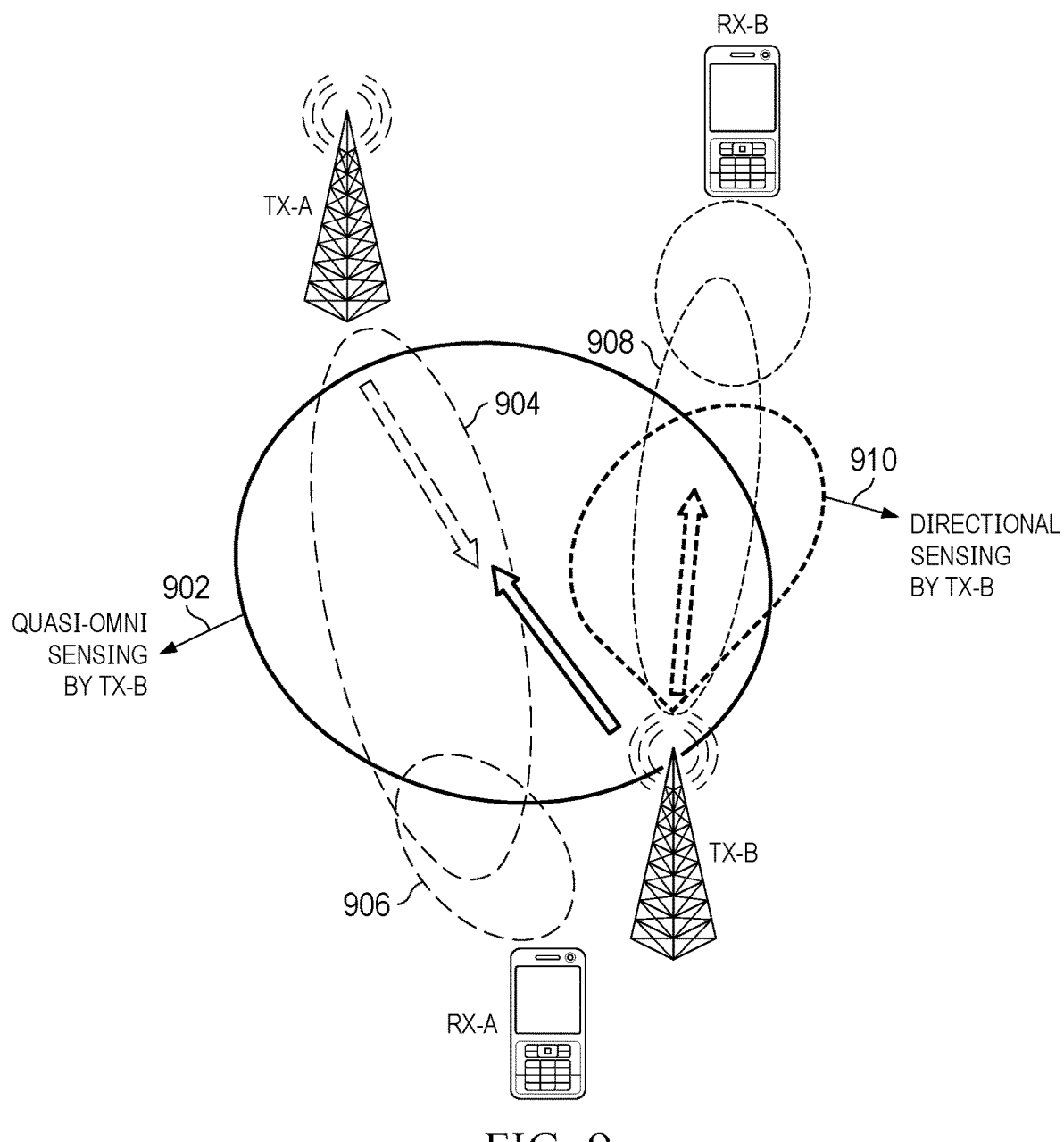
FIG. 9 illustrates a comparison between a quasi-omni sensing beam and a directional sensing beam in channel sensing.

In shared spectrum access in high frequency range, for example, FR2 or higher as in 3GPP, due to the higher carrier frequency (and hence smaller wavelengths) than FR2, it becomes possible to pack more antenna elements in the same form factor. This allows for realizing finer (narrower) beams. Improved beamforming gain is crucial in mitigating the more adverse path-loss at higher frequencies. Unlike licensed spectrum, sharing in unlicensed bands is achieved via a listen-before-talk (LBT) protocol. A key benefit of directional LBT—where the initiating node senses presence of ongoing transmissions for a certain duration using a directional sensing beam—is in improving spectrum access (spatial reuse) by avoiding the exposed node problem that afflicts omni directional sensing as illustrated by FIG. 9. In FIG. 9, an ongoing transmission between two wireless communication devices TX-A and RX-A is sensed by the node performing LBT (TX-B), when TX-B uses a quasi-omni sensing beam 902. During the ongoing transmission, TX-A may use a transmission beam 904, and RX-A may use a reception beam 906. Quasi-omni sensing exposes TX-A to RX-A link as an ongoing transmission that should be protected. Consequently, TX-B will back-off (dashed block arrows together with a cross X represent CCA check failure or busy channel detection). This is an over-protection since the intended beamformed transmission using a transmission beam 908 from TX-B to RX-B will not interfere with that ongoing transmission using the transmission beam 904 and the reception beam 906 (it is assumed here that the neither the main lobe nor any significant side lobes of the transmit beam intended to be used by TX-B are oriented towards the ongoing transmission). In this case TX-A is also not a hidden node causing interference to the intended receiver RX-B. However, if directional sensing using a sensing beam 910 is employed by TX-B then this issue is resolved.

One issue in directional LBT is the relationship between the sensing beam and the intended transmission beam(s), i.e., the beam(s) intended to be used by the initiating node within the channel occupancy time (COT) upon acquisition. Alternatively, after a beam is used to sense the channel, the beam(s) that can be used for transmission(s) during the COT by the initiating node after acquiring the channel should satisfy certain condition according to the sensing beam as well as the energy detection threshold for channel sensing. Here, non-idealities in the realized transmit beams (in terms of sidelobes) may also be accounted for. For instance, beam side-lobes of intended transmission beams can also interfere with ongoing transmissions. The basic objectives behind developing such a formal relation are that: (i) at-least ongoing transmissions that can be interfered by intended transmissions should be protected and to some extent (ii) interference to intended receivers from ongoing transmissions should be sensed.

Note that the state-of-art in EN 302 567 which considers LBT for the unlicensed 60 GHz frequency range does not address the scenario of interest to us, where an initiator node seeks to acquire the channel for multiple transmission bursts using possibly multiple different transmission beams. Indeed, the high-level description provided in the ETSI BRAN document for computing the energy detection threshold as well as subsequent testing, implicitly assume that the initiator node seeks to acquire the channel for a single transmission burst using a single transmission beam. In fact, the testing procedure described there will not preclude invalid implementations (such as passing the test using one beam but then using multiple other beams during the COT as well. Therefore, if the methodology from EN 302 567 is directly adopted for settings in this disclosure, it may result in co-existence issues and much degraded performance.

This disclosure outlines one approach towards achieving these objectives. For any intended transmit beam (say $B_i$), let $T_i(\Theta, \Phi)$ denote the angular power profile (APP) of that $i^{th}$ intended beam, where $(\Theta, \Phi)$ denote the angular (elevation and azimuth) coordinates. The APP of this beam may be defined as its far field EIRP profile or pattern. Recall that EIRP profile of a beam at any angular coordinate is the transmit power required to be given as input to an ideal isotropic radiator so that the power measured from it at any reference point in the far-field along that angular coordinate matches the power measured at the same reference point but from the transmission of the initiating node beamformed using the beam of interest. EIRP profile (in dBm) is hence equal to the gain profile (dBi) plus the power (dBm) supplied to the radiating elements.

In the first embodiment it may be assumed that a canonical set of intended transmit beams, C, is identified by the LBT initiating node (assumed to be a gNB for convenience while at least in some cases it can be a UE (handset, device, and etc.)). Every transmission by the gNB during the acquired COT will be done using either one of these beams or any subset of these beams (used in an SDM manner). Let $\{T\_i(\Theta, \Phi)\}$, $i \in C$ denote the transmit APPs of beams in this canonical set. Note here that since the COT duration can be relatively long (5 ms), it can be quite restrictive to upfront decide and fix all possible user groupings to determine exact SDM beam groupings. Hence, using a canonical set of individual transmit beams instead of transmit beam groups in order to derive requirements for sensing beams may provide more scheduling flexibility while also meeting LBT requirements. This provides with scheduling flexibility since at the time of sensing the precise order in which these beams are used or the SDM groupings they are part of during the COT may be unknown. Moreover, some of those beams might not be used during the COT.

Alternatively, the relationship between a sensing beam (with an associated sensing threshold) and the allowed transmission beam(s) during the acquired COT by the sensing beam is defined. After the channel is sensed and acquired using a sensing beam, any beam that satisfies the relationship with this sensing beam (with its associated sensing threshold) can be used for transmission(s) during the COT.

Given a canonical set, one or more sensing beams that should be used during LBT procedure are designed. There may be some design guidelines. Note that considering only one sensing beam for the whole set can be restrictive in that it can lead to a requirement that can be satisfied only by an omni or quasi-omni pattern. This defeats the purpose of directional sensing. In addition, sensing using one beam that covers entire canonical set does not provide sufficient granular information, i.e., if sensed energy is enough to declare the channel busy, it may not be clear if a subset of beams from the canonical set could have still been used. On the other hand, defining one sensing beam per intended transmit beam (that is a one to one relationship or mapping between the sensing beam and the transmit beam) is a feasible option but with the drawback that LBT duration overhead can be adversely impacted.

Then suppose that the canonical set C is partitioned into L clusters or beam groups (beam index sets) $C = C^{(1)} \cup C^{(2)} \dots \cup C^{(L)}$.

In one embodiment, each such beam cluster or index set can be constrained to include beams whose peaks have angular coordinates that are within a configurable angular distance of each other.

In another embodiment such a partition can be obtained by solving an optimization problem via an algorithm which accepts L along with all intended beams in canonical set as an input and clusters the beams in the canonical set into L groups based on a distance criterion or similarity measure. The latter distance between two beams can be based on the angular coordinates of their respective peaks as well as their beamwidths.

In yet another embodiment the number of clusters can also be an output of the clustering algorithm.

In another embodiment, one could define two or more sets of canonical beams, where a first set is used to sense the channel for a first set of transmission beams, the second set of canonical sensing beams are used for a second set of transmit beams and so forth. The COT could be initiated by an LBT (CCA check) that uses the first canonical set of sensing beams. Later during COT the second set of canonical sensing beams may be used prior to transmissions that use the second set of transmission beams and so forth, where the LBT type (duration) during the COT may be related to the time gap between the transmissions that use the first set of beams and the second set of beams, or with the time gap between the last LBT and the current LBT process.

A composite transmit APP for each one of the L index sets is defined as follows:

$$T^{(j)}(\Theta,\Phi) = \left[ \max_{i \in C^{(j)}} \{ l \right]_i (\Theta,\Phi) \}$$

tice that each composite transmit APP defined in (1) is the envelope or "max-hold" pattern over the constituent beam APPs (constituent beam EIRP patterns). Max-hold pattern for a set of input EIRP patterns is simply the pointwise maximum (the envelope) over those patterns.

Figure 10:
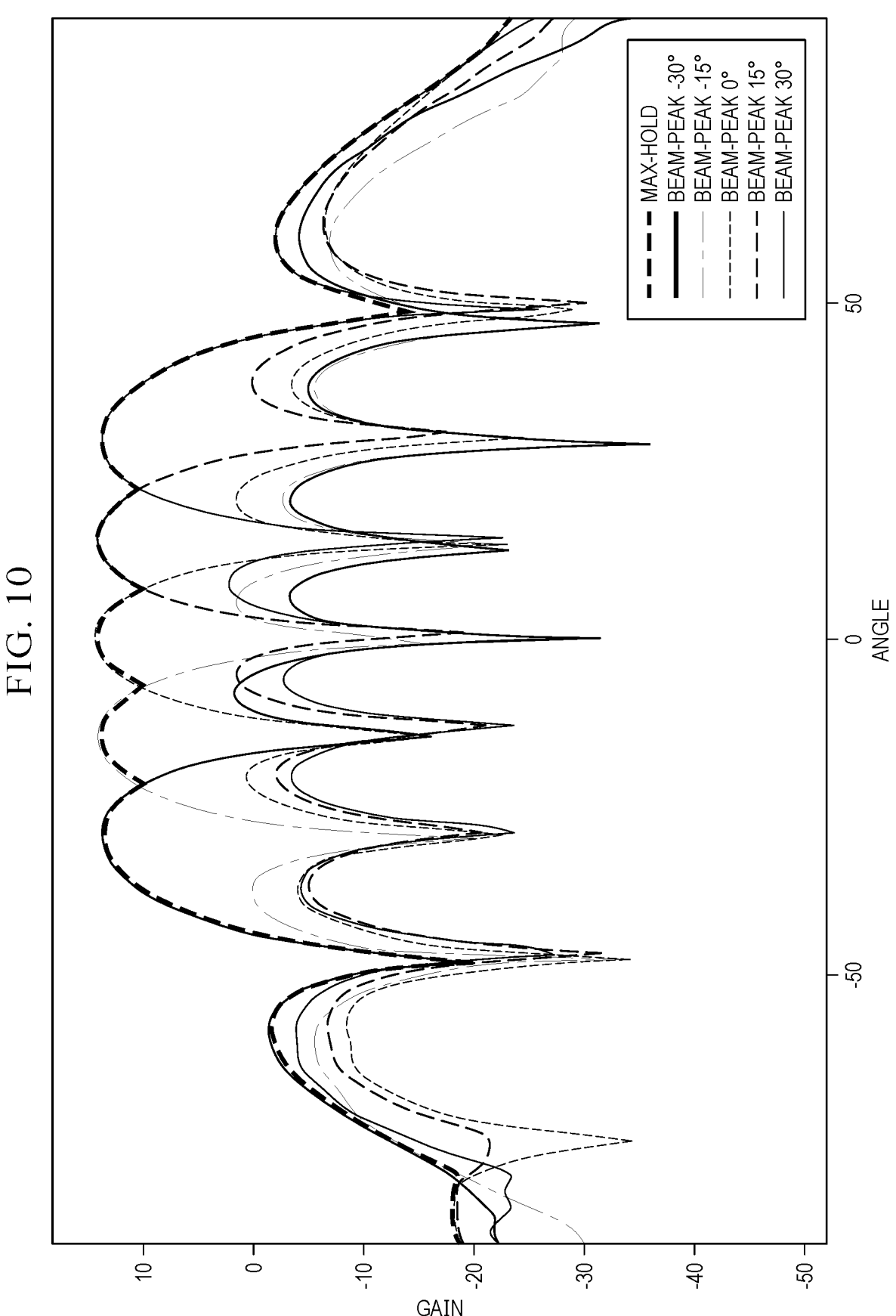
FIG. 10 illustrates an example composite transmit angular power profile (APP)

An example composite transmit APP is depicted in FIG. 10. As shown in FIG. 10, for five different beams each having a different APP pattern and a different peak direction $(-30°, -15°, 0°, 15°, 30°)$, a composite transmit APP or Max-hold pattern of these five beams is the pointwise maximum or the envelop of the five different APP patterns.

Using the envelope of individual beam EIRPs may ensure that any transmission using SDM groupings of those beams or any TDM sequence of transmissions along individual beams will not have EIRP exceeding that envelope in any angular direction. The envelope can be tight in case of TDM and a reasonably good upper bound otherwise.

Figure 11:
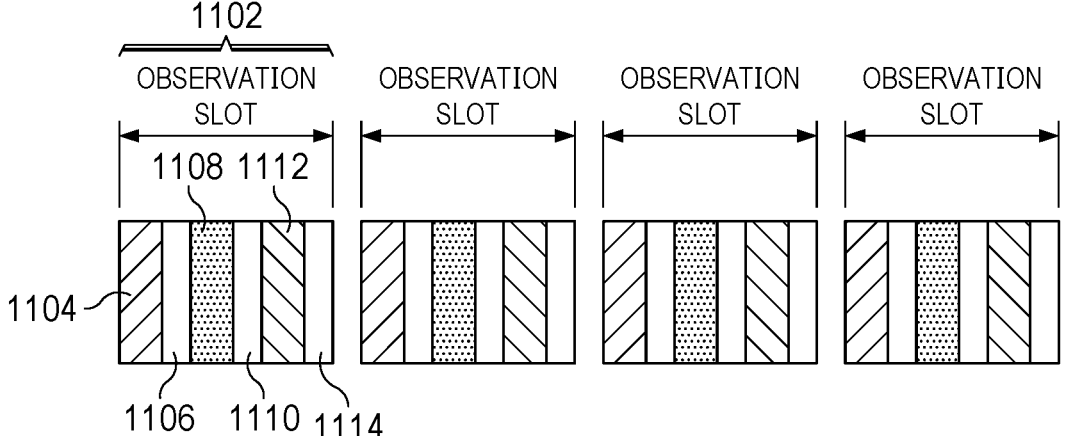
FIG. 11 illustrates an embodiment energy sensing stage including multiple observation slots.

In another embodiment, the initiator node can perform a first energy sensing stage comprising of multiple observation slots as shown in FIG. 11. In each such observation slot energy sensing is done using one or more sensing beams each for a certain smaller duration. One principle to schedule the energy sensing durations for different sensing beams is to adopt a round-robin fashion but taking into account beam switching gap (which is the minimal time gap needed by the initiator node to switch its beams) as well as the maxNumberRxTxBeamSwitchDL which is the maximum number of beam switches that node can make within an NR slot (which may be different from an observation or contention slot). For example, in an observation slot 1102, a first sensing beam is used in a duration 1104. After a switching gap 1106, a second sensing beam is used in a duration 1108. After a switching gap 1110, a third sensing beam is used in a duration 1112, which is followed by a switching gap 1114. Such scheduling may be referred to as round-robin with carry-over where there is a carry-over since not all sensing beams can necessarily be accommodated in each observation slot due to the aforementioned constraints. Hence the unaccommodated sensing beams are incorporated in the following slots and so on. After the energy sensing stage, the initiating node performs a back-off stage before acquiring COT.

Figure 12:
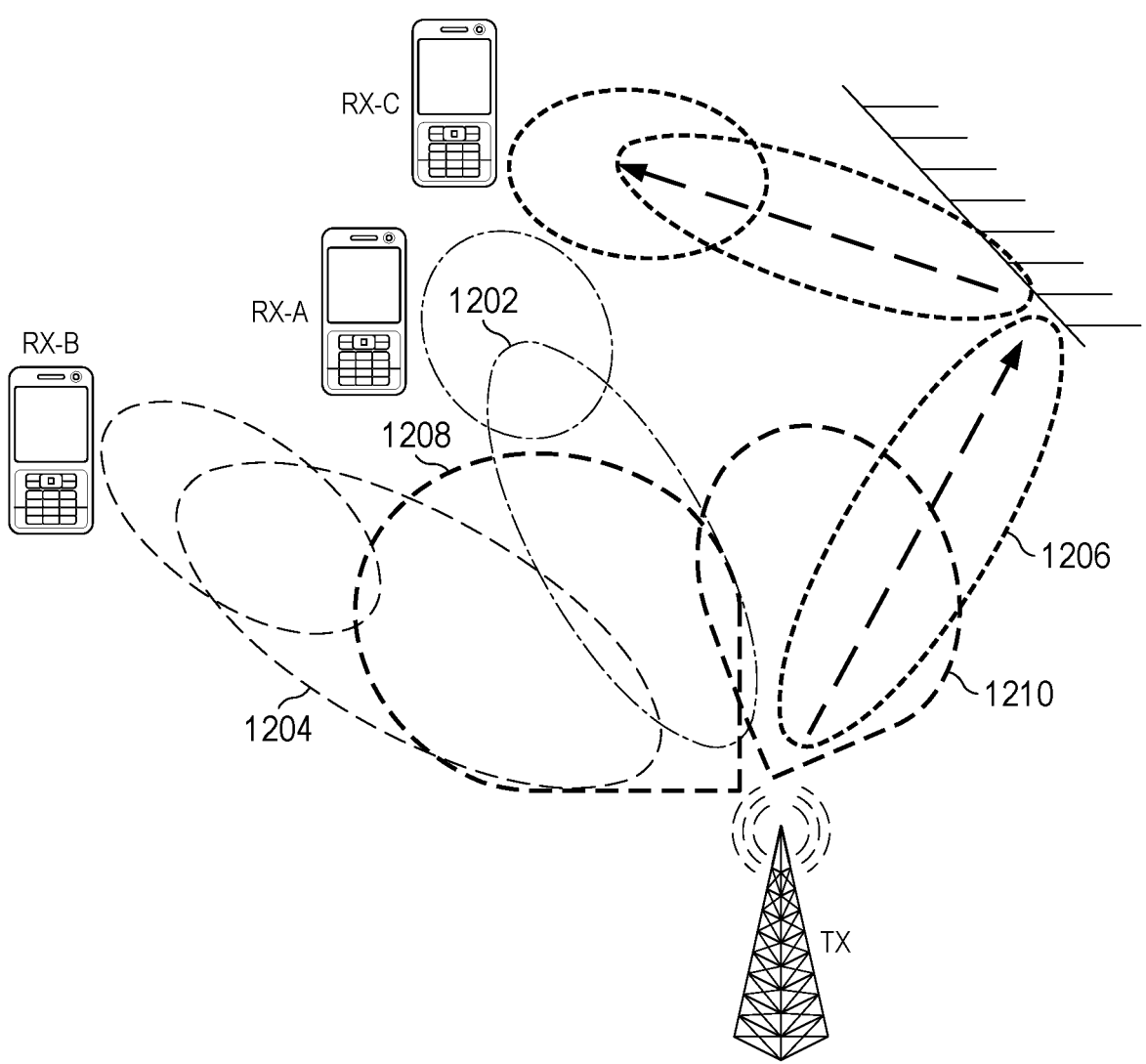
FIG. 12 illustrates an example of defining one sensing beam for each one of multiple beam sets.

Next sensing beam requirements are derived with the understanding that one sensing beam is defined for each one of the L beam index sets. A pictorial example of defining one sensing beam for each one of multiple beam sets is shown in FIG. 12. As shown in FIG. 12, a wireless communication device TX has 3 transmission beams 1202, 1204, and 1206. TX may intend to use these transmission beams to transmit data to wireless communication devices RX-A, RX-B, and RX-C. TX may only have 2 sensing beams 1208 and 1210. In this case, TX divides its transmission beams into 2 sets or groups (L=2). The first group includes transmission beams 1202 and 1204, and the second group includes the transmission beam 1206. The sensing beam 1208 covers the first group, and the sensing beam 1210 covers the second group.

While FIG. 12 can convey the intent, a more formal mathematical relation between the sensing beam defined for a beam set and the transmit beams in that set may be needed.

(i) Without loss of generality, this disclosure may focus on the $j^{th}$ beam index set $C^{(j)}$ and define a requirement that any sensing beam defined for the $j^{th}$ set $C^{(j)}$ may satisfy. Let $\Omega^{(j)}$ be a set of angular coordinates representing (elevation and azimuth) angle pairs of interest. This disclosure now describes some appropriate embodiments corresponding to different choices for this set of angular coordinates based on the composite transmit APP: one possible choice is to include all angular coordinates $\{(\Theta, \Phi)\}$ such that the composite transmit APP $T^{(j)}(\Theta, \Phi)$ evaluated at that $(\Theta, \Phi)$ is at-least a fraction of the peak, i.e., $$T^{(j)}(\Theta, \Phi) \geq \sigma \max_{(\Theta',\Phi')} T^{(j)}(\Theta', \Phi'),$$

where $\sigma$ is a configurable factor. This choice can also be specified in dB scale, i.e., all directions for which the composite transmit APP is within X-dB of the peak are included in the set $\Omega^{(j)}$.

(ii) The other choice is to substantially retain main lobes of the composite transmit APP in $\Omega^{(j)}$ by first selecting into $\Omega^{(j)}$ the angular coordinates of the top n highest peaks (corresponding to n transmit beams in the cluster) of the transmit APP $T^{(j)}(\Theta, \Phi)$, for some configurable scalar n (which is no greater than the number of beams in the cluster), and then further include all angular coordinates into $\Omega^{(j)}$ that are in the X-dB beam width of each of those n transmit beams.

(iii) Yet another alternative is that the set of angular coordinates of interest includes the X-dB beam width of any intended transmit beam including main lobe and substantial sidelobes.

In (i) and (ii) $\sigma$ and X are configurable factors. Note that prominent side-lobes of constituent beams in a beam set can be readily included in the set $\Omega^{(j)}$ by using (i) and appropriately configuring factor G. In this context including significant side-lobes in the direction set of interest may be important since these side lobes can potentially interfere and disrupt ongoing transmissions.

In the first embodiment let $S^{(j)}(\Theta, \Phi)$ denote the AGP (angular gain profile) of the j-th sensing beam (this AGP can for instance include sensing beamforming gain along with gain/loss of the sensing assembly). Note here that unlike EIRP of any beam there is no dependence on any transmit power $S^{(j)}(\Theta, \Phi)$. An ideal omni beam sensing pattern will have an AGP $S^{(j)}(\Theta, \Phi)=A$ for all angular coordinates (or directions) and for some constant A. Directional sensing patterns on the other hand will favor some directions over the remaining ones. Then, the requirement on the sensing beam is given by:

$$S^{(j)}(\Theta, \Phi) \geq \alpha^{(j)}\left(\frac{T^{(j)}(\Theta, \Phi)}{\hat{T}^{(j)}}\right), \forall (\Theta, \Phi)\epsilon\Omega^{(j)}, \qquad (2a)$$

where $\alpha^{(j)}>0$ is a scale-factor and $$\hat{T}^{(j)} = \max_{(\Theta',\Phi')} T^{(j)}(\Theta', \Phi')$$

is the peak composite transmit APP. In words, (2a) requires that the AGP of the sensing beam dominate the normalized composite transmit APP over the set $\Omega^{(j)}$ of angular coordinates and up-to a factor $\alpha^{(j)}$. The normalization of the composite transmit APP removes the dependence on power and thus it can be compared with the sensing AGP that does not have any dependence on transmit power.

Put differently, to cover a group of transmit beams the sensing beam gain profile shall dominate over a set of directions (i.e., shall exceed in every direction in that set of directions), the scaled normalized envelope of the EIRP profiles of the constituent beams in the group. Furthermore, that scaling factor shall be used to compute the EDT.

In various embodiments, the scale-factor $\alpha^{(j)}$ is determined as 1 if at least one sensing beam satisfies the unscaled requirement (i.e., applying $\alpha^{(j)}=1$ to equation (2a)). In other words, if a sensing beam can satisfy the unscaled requirement, then no scaling (or compensation to the sensing beam) is needed. If only one sensing beam satisfies the unscaled requirement, then this sensing beam will be selected as the sensing beam for the j-th beam set. If multiple sensing beams satisfy the unsealed requirement, then the sensing beam for the j-th beam set is selected from the multiple sensing beams. In one embodiment, any sensing beam from the multiple sensing beams may be selected. In another embodiment, a sensing beam with the lowest gain among the multiple sensing beams may be selected. In yet another embodiment, a sensing beam with the narrowest beamwidth among the multiple sensing beams may be selected. Different criteria may also be used to select the sensing beam for the j-th beam set.

In various embodiments, if no sensing beam (from a set of candidate sensing beams or predetermined sensing beams) satisfies the unscaled requirement, then a scale-factor $\alpha^{(j)}$ different than 1 will need to be determined. In other words, scaling is needed to compensate shortcomings of the sensing beam. The scale factor and the sensing beam for the j-th beam set may be determined as follows. First, determine a respective scale factor for each sensing beam in the set of candidate sensing beams so that each sensing beam satisfies the scaled requirement (equation (2a)). Then, select the largest scale factor and the corresponding sensing beam as the scale factor and the sensing beam for the j-th beam set. Thus, among the candidate sensing beams, the one that satisfies the sensing beam requirement with the least compensation will be selected. Methods to determine a scale factor and a sensing beam given a sensing beam requirement as described above may also be applied to other scenarios in the present disclosure.

One observation on (2a) is that sensing beam pattern should have enough sensing gain at-least in the directions in which at-least one of the intended TX beams will radiate a larger fraction of input energy, i.e., in directions where $T^{(j)}(\Theta, \Phi)$ is relatively larger. Conversely, directions along which all intended TX beams have small gains can be sensed with a relatively smaller gain. This is a departure from conventional (quasi-)omni sensing wherein all directions are sensed with (near-)identical gains.

The scale-factor $\alpha^{(j)}$ (also referred to here as an adjustment factor) can be absorbed in the energy detection threshold (EDT) computation using the following formula which is simple modification of the one from EN 302 567 v2.1.20. Indeed, the EDT can be computed as $$EDT = -80 \text{ dBm} + 10 \times \log_{10} \frac{Pmax}{f(Pout, \alpha^{(j)})} + \qquad (2b)$$

$$10 \times \log_{10} \text{ Operating Channel } BW \text{ in MHz}$$

where $P_{out}$ is the maximal EIRP over the cluster of beams during the COT, i.e., $$P_{out} = \max_{(\Theta',\Phi')} T^{(j)}(\Theta', \Phi').$$

One example of the function $f(Pout, \alpha^{(j)})$ is $$f(Pout, \alpha^{(j)}) = \frac{APout}{\alpha^{(j)}},$$

where A>0 is a constant whose default value represents gain of the reference omni pattern. In particular, A is the gain of the omni pattern implicitly assumed to be used for sensing when applying the original formula for EDT computation proposed in EN 302 567 v2.1.20 for the single burst scenario envisaged there (i.e., (2b) with $f(Pout, \alpha_{(j)})=Pout$ but in which Pout represents the peak EIRP of a single burst transmitted during the COT using a single beam). Design principles behind (2b) are the following. Along each angular direction $(\Theta, \Phi)$ the LBT initiating node can be considered to be a virtual isotropically radiating node which will transmit with power $T^{(j)}(\Theta, \Phi)$ upon acquiring the channel. Then, further supposing this virtual node to use reference omni sensing, appropriate EDT to use would be (2b) where $f(Pout, \alpha^{(j)})=T^{(j)}(\Theta, \Phi)$. Given a sensing pattern that satisfies (2a) instead, the EDT in (2b) may be used in which $$f(Pout, \alpha^{(j)}) = \frac{APout}{\alpha^{(j)}}.$$

The latter will ensure that any ongoing transmission that is flagged (i.e., detected with enough signal strength to result in the channel being labeled busy), by the virtual node when using reference omni sensing, will also be flagged when the latter uses the available sensing pattern satisfying (2a). Notice here that $$\frac{1}{\lceil \min(\alpha)^{(j)}, 1)}$$

can be viewed as a shortfall in the sensing gain over the set of directions $\Omega^{(j)}$. This implies that if a given sensing beam is narrower in that it does not have sufficient gain over at-least some prominent directions (i.e., over some directions in $\Omega^{(j)}$) then it will have a larger shortfall and which (conforming to intuition) consequently results in smaller EDT as per (2b). Compensating the EDT using this shortfall ensures an appropriate EDT so that lower sensed energy (due to the shortfall in sensing gain) is not compared to the original higher EDT, and thereby respecting LBT requirements. In other words, the EDT uses a scaling by $\alpha^{(j)}$. A smaller value $\alpha^{(j)}$ implies a somewhat easier selection of sensing beam but then sensing process has to become more sensitive with respect to energy detection (via lower the energy detection threshold) for fair spectrum sharing, and vice versa. Since an EDT for each beam set or group may be determined by a corresponding scale factor, different beam sets or groups may use separate EDTs and these separate EDTs may be different.

Methods to determine the EDT in accordance with the scale factor $\alpha^{(j)}$ as described above may also apply to other scenarios in the present disclosure.

Note that the requirement in (2a) is a beam correspondence type requirement. In other words, (2a) also defines a spatial relationship between the sensing (receive) and transmit beams.

In another embodiment, first define an envelope of transmit beamforming gains as $$\tilde{T}^{(j)}(\Theta, \Phi) = \lceil \max_{i \in C(j)} \{\tilde{T}\}_i (\Theta, \Phi) \}$$

where each $\tilde{T}_i(\Theta, \Phi)$ denotes the beamforming gain profile of the ith transmit beam which is defined as its EIRP divided by the net transmit power. A constraint on the sensing gain profile can be specified as $$S^{(j)}(\Theta, \Phi) \geq \tilde{a}^{(j)} \tilde{T}^{(j)}(\Theta, \Phi), \forall (\Theta, \Phi) \in \Omega^{(j)}$$

In words for a sensing beam to cover a group of transmit beams, the sensing beam gain profile shall dominate over a set of directions (i.e., shall exceed in every direction in that set of directions), the scaled envelope of the beamforming gain profiles of the constituent transmit beams in the group. Furthermore, that scaling factor shall be used to compute the EDT.

In an alternate embodiment instead of defining $$P_{out} = \max_{(\Theta', \Phi')} T^{(j)}(\Theta', \Phi'),$$

$P_{out}$ may be defined as the weighted sum of the peaks of the constituent per-beam transmit APPs, i.e., weighted sum of the per-beam peak EIRPs:

$$P_{out} = \sum_{i \in C(j)} w_i \max_{(\Theta', \Phi')} T_i(\Theta', \Phi').$$

In one embodiment the weights $\lceil \{w\}_i \}$ can each be identical to the inverse of the number of beams in the cluster so that $P_{out}$ becomes the mean of the per-beam peak EIRPs.

In another embodiment the weight assigned to each beam can be its anticipated duty cycle i.e., the anticipated fraction of time the initiator expects to use this beam for transmission over the duration of the COT.

In all such embodiments the resulting $P_{out}$ can be used in (2a) to define beam requirement after setting $\hat{T}^{(j)} = P_{out}$ and then in (2b) to compute the EDT as well.

In another embodiment, the validity of any sensing pattern can be asserted if it satisfies, $$\min_{(\Theta', \Phi') \in \Omega^{(j)}} S^{(j)}(\Theta', \Phi') \geq A \tag{3}$$

for some constant A which is the reference omni pattern gain. In words, the requirement in (3) mandates that the sensing pattern dominates a reference gain omni pattern over the angular coordinate set of interest. Put differently (3) can be viewed as insisting that the sensing pattern match a reference omni pattern within the directions of interest. Then, in this embodiment if (3) is satisfied then the EDT can be determined as $$EDT =$$
$$-80 \text{ dBm} + 10 \times \log_{10} \frac{Pmax}{Pout} + 10 \times \log_{10} \text{ Operating Channel } BW \text{ in MHz.}$$

In case A=1 the original EDT formula is being used to determine the threshold without any adjustment.

In yet another more general embodiment, given any sensing pattern $S^{(j)}(\Theta, \Phi)$, a scale factor can be determined as $$\alpha^{(j)} = \min_{(\Theta', \Phi') \in \Omega^{(j)}} S^{(j)}(\Theta', \Phi') \tag{4}$$

In words, the scale (or adjustment) factor is determined as the worst-case sensing pattern value over the set of angular coordinates of interest. This scale factor in this embodiment can be used to compute $f(Pout, \alpha^{(j)}) = (1/\lceil \alpha^{(j)}))P \rfloor$ _out before computing the EDT using (2b). Notice that in (4) the worst case sensing gain over directions of interest for any given sensing pattern can be determined whereas in (3) the feasible set of sensing patterns comprises of those for which sensing gains satisfy a constraint. Any sensing pattern is feasible for (4) as long as it does not have a null at any direction in the angular coordinate set of interest $\Omega^{(j)}$.

The conditions in (3) and (4) may depend on the composite transmit APP via the angular coordinate set $\Omega^{(j)}$. Indeed, the condition in (3) may require that the sensing gain exceed a reference gain A over all angular coordinates (directions) of interest. Similarly, (4) determined the worst-case sensing gain over the directions of interest and then adjusts the peak EIRP using the worst-case gain before computing the EDT.

In one embodiment using (i) with $\sigma = \frac{1}{2}$ and the sensing requirement in (3) with A=$\frac{1}{2}$ would mean that all directions with EIRP within $\frac{1}{2}$ of the peak are covered by the sensing beam with at least $\frac{1}{2}$ gain factor.

In another embodiment, sensing requirement can be derived by instead considering a sensing angular power profile (sensing APP), $\tilde{S}^{(j)}(\Theta, \Phi)$, defined to be the transmit APP of a virtual setup in which the initiating node uses the sensing beam as a transmit beamformer and sensing array assembly for transmission (with the same transmit power as before). In this case, a requirement that the sensing APP dominate the transmit APP can be formulated as:

$$\tilde{S}^{(j)}(\Theta, \Phi) \geq a^{(j)} T^{(j)}(\Theta, \Phi), \forall (\Theta, \Phi) \epsilon \Omega^{(j)} \tag{5}$$

where $\alpha^{(j)}$ is a scale factor. In this embodiment the EDT is modified as $$EDT = -80 \text{ dBm} + 10 \times \log_{10} \frac{\alpha^{(j)} Pmax}{Pout} +$$
$$10 \times \log_{10} \text{ Operating Channel } BW \text{ in MHz.}$$

In yet another embodiment, given a sensing beam pattern APP $\tilde{S}^{(j)}(\Theta, \Phi)$, a transmit beam APP $T(\Theta, \Phi)$ used for transmission data channel(s) or signal(s) during the COT acquired by the sensing beam, following requirement needs to be satisfied:

$$\tilde{S}^{(j)}(\Theta, \Phi) \geq a^{(j)} T(\Theta, \Phi), \forall (\Theta, \Phi) \epsilon \Omega^{(j)} \tag{6}$$

Here $\alpha^{(j)}$ is a scale-factor and the set of angular coordinates $\Omega^{(j)}$ is the X-dB beam width of the transmit beam including main lobe and substantial sidelobes where the APP $T(\Theta, \Phi)$ is within the X-dB of its peak. The values of $\alpha^{(j)}$ is considered in EDT determination for proper scaling. The value of X-dB may also be considered in EDT determination. Note that if (6) is satisfied for all transmit beams, it is very similar to that of (5). And in this alternative, there is no need to determine a set (or subset) of intended transmit beams for sensing beam selection.

In yet another embodiment, given a sensing beam gain pattern AGP $\tilde{S}^{(j)}(\Theta, \Phi)$, a transmit beam EIRP $T(\Theta, \Phi)$ used for transmission data channel(s) or signal(s) during the COT acquired by the sensing beam, following requirement needs to be satisfied:

$$\tilde{S}^{(j)}(\Theta, \Phi) \geq a^{(j)} T(\Theta, \Phi), \forall (\Theta, \Phi) \epsilon \Omega^{(j)}.$$

Here $\alpha^{(j)}$ is a scale-factor and the set of angular coordinates $\Omega^{(j)}$ is the X-dB beam width of the transmit beam including main lobe and substantial sidelobes where the EIRP $T(\Theta, \Phi)$ is within the X-dB of its peak. The values of $\alpha^{(j)}$ is considered in EDT determination for proper scaling. The value of X-dB may also be considered in EDT determination.

In yet another embodiment, given a sensing beam gain pattern AGP $\tilde{S}^{(j)}(\Theta, \Phi)$, a transmit beam EIRP $T(\Theta, \Phi)$ used for transmission data channel(s) or signal(s) during the COT acquired by the sensing beam, following requirement needs to be satisfied:

$$\tilde{S}^{(j)}(\Theta, \Phi) \geq a^{(j)} \hat{S}^{(j)}, \forall (\Theta, \Phi) \epsilon \Omega^{(j)}.$$

Here $\hat{S}^{(j)}$ is the peak of the sensing beam gain $$\max_{(\Theta', \Phi')} \tilde{S}^{(j)}(\Theta', \Phi').$$

$\alpha^{(j)}$. cx is a scale-factor and the set of angular coordinates $\Omega^{(j)}$ is the X-dB beam width of the transmit beam including main lobe and substantial sidelobes where the EIRP $T(\Theta, \Phi)$ is within the X-dB of its peak $\tilde{T}$. The values of $\alpha^{(j)}$ is considered in EDT determination for proper scaling. The value of X-dB may also be considered in EDT determination.

Now consider a practically relevant scenario in which the set of transmit beams may not be precisely known. This disclosure outlines different embodiments corresponding to different modeling choices.

In the first embodiment only the peak gain as well as direction of that peak for each transmit beam is known up-to a tolerance, along with an estimate of beamwidth. In particular, in this case instead of knowing the APP of the i-th beam $T_i(\Theta, \Phi)$ in the cluster only an estimate of its peak (i.e., peak EIRP), peak direction and its X-dB beamwidth, for some X (an example value of X can be X=3) may be available. A requirement for sensing beam in which the set of angular coordinates of interest $\Omega^{(j)}$ includes the peak of each beam $i \epsilon C^{(j)}$ as well as all angular pairs $(\Theta, \Phi)$ that lie within the X-dB beamwidth of that ith beam for each beam $i \epsilon C^{(j)}$ can be formulated. Equations (3) or (4) may be used to define the sensing pattern requirements along with their respective EDT computations.

In words, the requirement in (3) in this case mandates that for a sensing beam to cover a set of transmit beams, the sensing gain of that sensing beam shall be above a reference value for all directions (or angle pairs) that lie in the X-dB beam width of every transmit beam in the set of beams covered by that sensing beam.

Alternatively, the requirement in (4) in this case mandates that for a sensing beam to cover a set of transmit beams, the sensing gain of that sensing beam shall be above a certain gain value for all directions (or angle pairs) that lie in the X-dB beam width of every transmit beam in the set of beams covered by that sensing beam, and further that gain value will be used to adapt the EDT.

In another embodiment, a sensing beam is said to cover a set of transmit beams, if the Y dB beam-width of the sensing beam includes all directions (or angle pairs) that lie in the X-dB beam width of every transmit beam in the set of beams covered by that sensing beam, and further the value Y will be used to adapt the EDT. In another embodiment the EDT may be adapted based on the value Y as well as the peak sensing beam gain.

In yet another embodiment, a sensing beam is said to cover a set of transmit beams, if the sensing beam gain measured along the peak direction of each transmission beam is at least X-dB of the peak gain of the corresponding transmission beam. The value X will be used to adapt the EDT. In another embodiment the EDT may be adapted based on the value X as well as the peak transmission beam gain.

In yet another embodiment an estimate of the peak EIRP and peak EIRP direction of each beam may be available. Here beamwidth may be defined as distance pair (d_i^$\Theta$, d_i^$\Phi$) so that all angular coordinates (directions) whose elevation ($\Theta$) and azimuth ($\Phi$) angles are within specified limits (d_i^$\Theta$, d_i^$\Phi$) of the peak direction are included in set of angular coordinates of interest $\Omega^{(j)}$. Equation (3) or (4)

may be used to define the sensing pattern requirements along with their respective EDT computations.

In another embodiment, a sensing beam is said to cover a set of transmit beams if an angle or direction included in the X dB beamwidth of the set of transmit beams is included in the Y dB beamwidth of the sensing beam. Both X and Y are configurable parameters. The X dB beamwidth of the set of transmit beams may be determined in accordance with a composite transmit APP of the set of transmit beams or a Max-hold EIRP of the set of transmit beams. In one example, X=3.

In another embodiment, a sensing beam is said to cover a set of transmit beams if a gain of the sensing beam measured along the peak direction of the set of transmit beams is at least X dB of a gain of the set of transmit beams measured along the same direction. X is a configurable parameter. The gain of the set of transmit beams and the peak direction may be determined in accordance with a composite transmit APP of the set of transmit beams or a Max-hold EIRP of the set of transmit beams.

In another embodiment, a sensing beam is said to cover a set of transmit beams if a gain of the sensing beam measured in one or more directions is at least X dB of a gain of the set of transmit beams measured in the same direction. The gain of the set of transmit beams is determined in accordance with a composite transmit APP of the set of transmit beams or a Max-hold EIRP of the set of transmit beams. The one or more directions include each direction where the composite transmit APP (or the Max-hold EIRP) of the set of transmit beams is within (i.e., is larger than) Y dB of the peak of the composite transmit APP (or the Max-hold EIRP). Both X and Y are configurable parameters.

In another embodiment, a sensing beam is said to cover a set of transmit beams if a gain of the sensing beam measured in one or more directions is at least X dB of a peak gain of the sensing beam. The one or more directions include each direction where the composite transmit APP (or the Max-hold EIRP) of the set of transmit beams is within (i.e., is larger than) Y dB of the peak of the composite transmit APP (or the Max-hold EIRP). Both X and Y are configurable parameters.

This disclosure next considers an embodiment wherein the sensing can be simultaneously done using multiple sensing beams. This corresponds to for instance the case where the initiating node is capable of sensing simultaneously via multiple sensing beams each connected to a different receive RF chain.

In one embodiment for such a scenario, multiple clusters can be simultaneously sensed using multiple sensing beams (each sensing beam associated with one cluster of transmit beams). The relation between each sensing beam and the cluster of transmit beams it is associated with can be one from the multiple relations outlined above.

In another embodiment the initiator senses across multiple carriers. Here the relation between sensing beam can be defined on a per-carrier basis.

This disclosure next describes the sensing procedure that can be conducted as follows. In one embodiment the initiating node can sequentially perform LBT for each one of the L beam sets.

Figure 13:
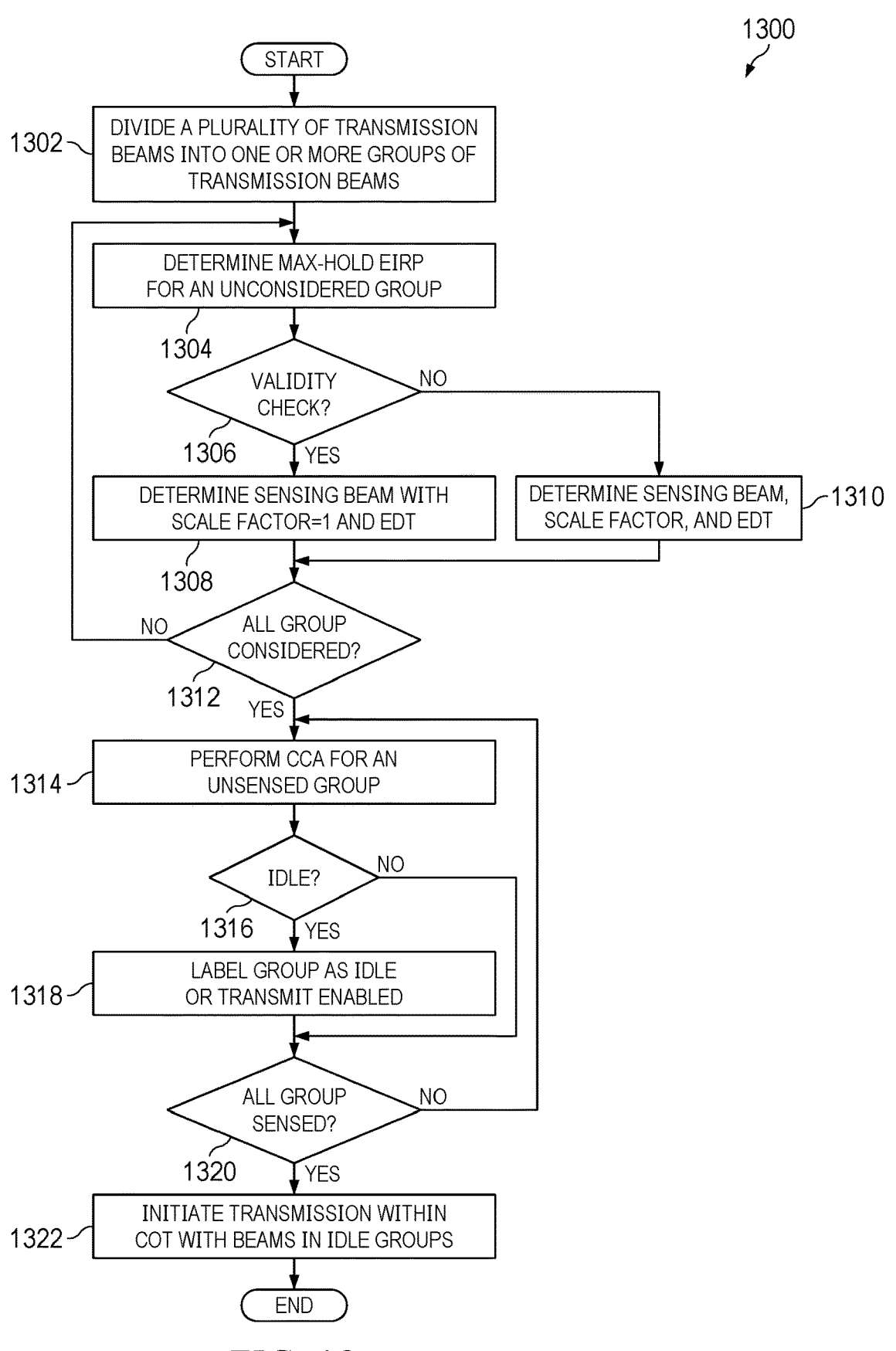
FIG. 13 illustrates an embodiment process flow for determining sensing beams for multiple groups of transmission beams and performing Clear Channel Assessment (CCA) procedures.

FIG. 13 depicts a process flow for determining sensing beams for multiple groups of transmission beams and performing CCA procedures. In this scenario, a wireless communication device has a plurality of transmission beams and a set of candidate sensing beams. The wireless communication device seeks to find sensing beams from the set of candidate sensing beams that can be used for CCA procedures to obtain channels for the plurality of transmission beams. The wireless communication device may conduct the following procedure.

The flow chart 1300 begins at step 1302, where the wireless communication device divides the plurality of transmission beams into one or more groups of transmission beams. This step may also be called clustering or partition. The clustering or partition may be conducted in accordance with a clustering algorithm described in this disclosure. Next, for each of the one or more groups, the wireless communication device seeks to find a respective sensing beam from the set of candidate sensing beams so that the sensing beam covers a corresponding group.

At step 1304, one group of transmission beams is considered. The wireless communication device may determine a max-hold EIRP for this group. In various embodiments, the wireless communication device may determine a composite transmit APP for this group.

At step 1306, the wireless communication device checks if any sensing beam in the set of candidate sensing beams covers the group of transmission beams. The wireless communication device may determine a sensing beam requirement for this group. If one sensing beam satisfies the sensing beam requirement without scaling (denoted by "Y" in FIG. 13), then the flow chart 1300 goes to step 1308, where the sensing beam is selected as the sensing beam for this group, and the scale factor=1. If no sensing beam satisfies the sensing beam requirement (denoted by "N" in FIG. 13), then the flow chart 1300 goes to step 1310, where the wireless communication device determines a scale factor and a sensing beam so that the sensing beam satisfies the sensing beam requirement scaled by the scale factor. In both steps 1308 and 1310, an EDT is determined in accordance with the scale factor.

At step 1312, if the wireless communication device has considered all of the one or more groups, the flow chart 1300 goes to step 1314. Otherwise, the wireless communication device selects a group which has not been considered, and goes back to step 1304.

After the wireless communication device determines a sensing beam, a scale factor and an EDT for each group, the wireless communication device will perform separate CCA procedures for each group.

At step 1314, the wireless communication device selects one group for which no CCA has been performed yet. The wireless communication device will perform CCA for this group using the sensing beam for this group and the corresponding EDT. In other words, the wireless communication device use the sensing beam to detect energy and compare the detected energy level with the corresponding EDT to determine if a channel is idle or busy.

At step 1316, if a channel is idle, then this channel is suitable for the wireless communication device to transmit using this group of transmission beams. The flow chart 1300 goes to step 1318, where the wireless communication device labels this group as "idle" or "transmit enabled." If a channel is not idle, then this channel is not suitable for the wireless communication device to transmit using this group of transmission beams. In this case, the flow chart goes to step 1320.

At step 1320, if the wireless communication device has performed CCA procedures for all groups, the flow chart 1300 goes to step 1322. Otherwise, the wireless communication device will select another group for which no CCA has been performed yet, and the flow chart goes back to step 1314.

At step 1322, the wireless communication device will initiate transmission within COT using each group of transmission beams which has been labeled as "transmit enabled."

Figure 14:
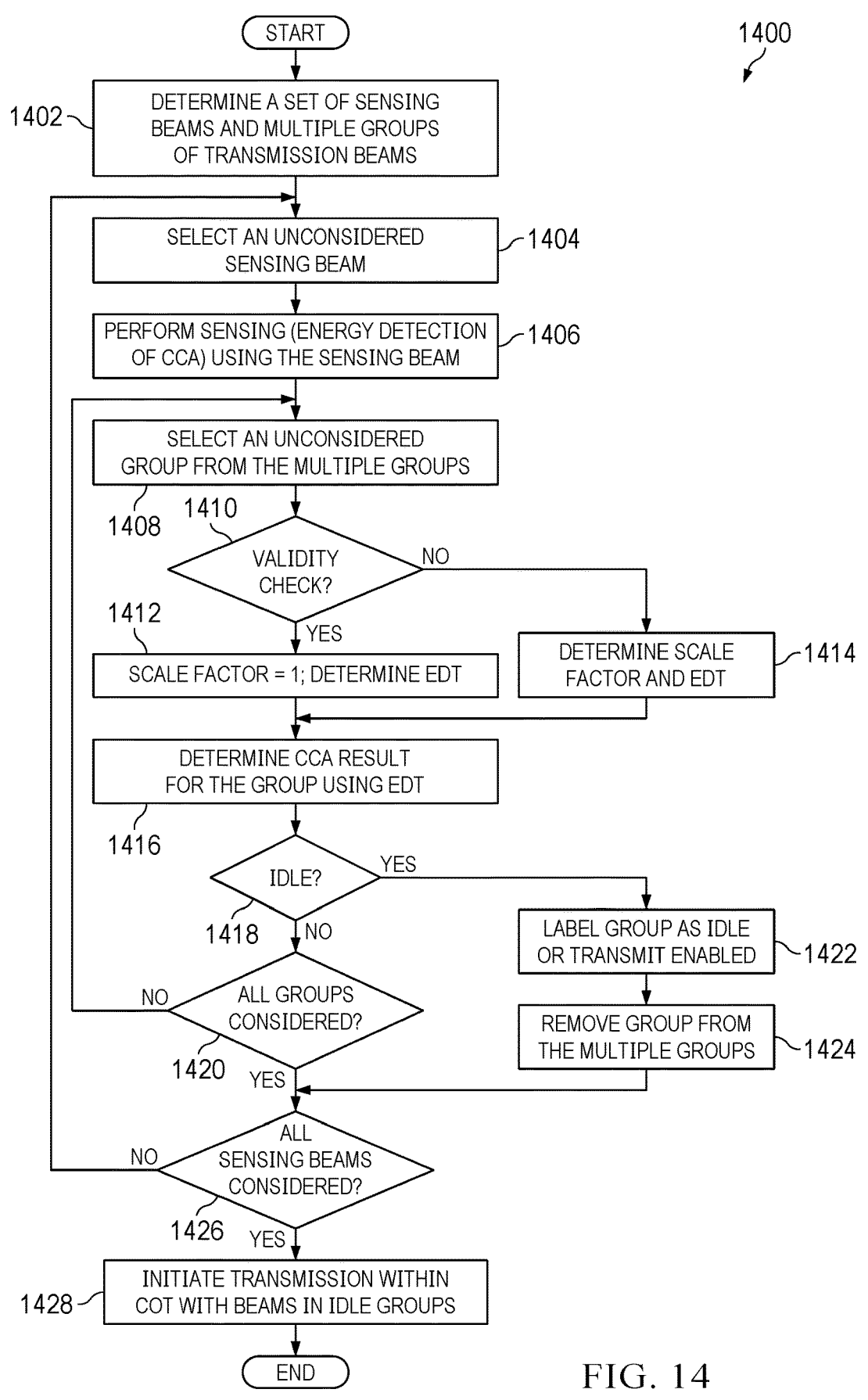
FIG. 14 illustrates an embodiment process flow for determining groups of transmission beams for multiple given sensing beams and performing CCA procedures.

FIG. 14 depicts an alternatively process flow for determining groups of transmission beams for multiple given sensing beams and performing CCA procedures. In this scenario, a dual problem is considered. Similar to the scenario illustrated in FIG. 13, the wireless communication device also has a plurality of transmission beams and a set of candidate sensing beams. It has been predetermined that each of the set of candidate sensing beams will be used for sensing in CCA procedures. In this case, the wireless communication device seeks to find a group of transmission beams from the plurality of transmission beams that is covered by each sensing beam. The wireless communication device may conduct the following procedure.

The flow chart 1400 begins at step 1402, where the wireless communication device divides the plurality of transmission beams into multiple groups of transmission beams.

At step 1404, the wireless communication device considers one sensing beam selected from the set of candidate sensing beams which has not been considered yet.

At step 1406, the wireless communication device performs sensing (energy detection) part of a CCA procedure using the selected sensing beam. The wireless communication device may observe an operating channel for a duration using the selected sensing beam. A result of the CCA procedure (whether the operating channel is idle or busy) is not determined yet because the detected energy will be compared to an EDT and the EDT may have yet to be determined by the wireless communication device.

At step 1408, the wireless communication device considers one group selected from the multiple groups which has not been considered yet.

At step 1410, the wireless communication device checks if the sensing beam covers the group of transmission beams. The wireless communication device may determine a sensing beam requirement for this group. If the sensing beam satisfies the sensing beam requirement without scaling, the sensing beam is deemed valid (denoted by "Y" in FIG. 14) for the group (i.e., the validity check is successful). Then the flow chart 1400 goes to step 1412, where the sensing beam is selected as the sensing beam for this group, and the scale factor=1. If the sensing beam does not satisfy the sensing beam requirement, then the flow chart 1400 goes to step 1414, where the wireless communication device determines a scale factor so that the sensing beam satisfies the sensing beam requirement scaled by the scale factor.

In both steps 1412 and 1414, the wireless communication device determines an EDT in accordance with the scale factor.

At step 1416, the wireless communication device determines the result of the CCA procedure for the group of transmission beams using the EDT. The wireless communication device may compare the energy detected at step 1406 with the EDT determined at step 1412 or step 1414. The wireless communication device determines the operating channel as idle if the detected energy is smaller than the EDT and determines the operating channel as busy otherwise.

At step 1418, if the CCA procedure is successful (the sensed channel or the operating channel is idle), the flow chart 1400 goes to step 1422. If the CCA procedure is not successful (the sensed channel or the operating channel is busy), the flow chart 1400 goes to step 1420.

At step 1420, if the wireless communication device has considered all of the multiple groups, the flow chart goes to step 1426. Otherwise, the wireless communication device selects another group from the multiple groups, which has not been considered yet, and the flow chart goes back to step 1408.

At step 1422, the wireless communication device labels the group as "idle" or "transmit enabled." Then the wireless communication device removes the group from the multiple groups at step 1424.

At step 1426, if the wireless communication device has considered all of the set of candidate sensing beams, then the flow chart goes to step 1428. Otherwise, the wireless communication device selects another sensing beam from the set of candidate sensing beams, which has not been considered yet, and the flow chart goes back to step 1404.

At step 1428, the wireless communication device initiates transmission with COT using each group of transmission beans which has been labeled as "idle."

FIG. 15A illustrates an embodiment method 1500 for directional channel sensing. The method 1500 begins at step 1502, where a wireless communication device divides a plurality of transmission beams into one or more groups of transmission beams. The one or more groups of transmission beams include at least a first group of transmission beams. The method 1500 proceeds to step 1504, where the wireless communication device determines a first sensing beam requirement for the first group of transmission beams. The method 1500 proceeds to step 1506, where the wireless communication device determines a first sensing beam and a first scale factor so that the first sensing beam satisfies the first sensing beam requirement scaled by the first scale factor. The first sensing beam is selected from a set of candidate sensing beams. At step 1508, the wireless communication device performs a first CCA using the first sensing beam and a first EDT. The first EDT determined in accordance with the first scale factor.

FIG. 15B illustrates optional steps for directional channel sensing. The one or more groups of transmission beams in FIG. 15A may further include a second group of transmission beams. In this case, the method 1500 may include additional steps. The method 1500 may proceed to step 1510, where the wireless communication device determines a second sensing beam requirement for the second group of transmission beams. The method 1500 may proceed to step 1512, where the wireless communication device determines a second sensing beam and a second scale factor so that the second sensing beam satisfies the second sensing beam requirement scaled by the second scale factor. The second sensing beam also is selected from the set of candidate sensing beams. At step 1514, the wireless communication device performs a second CCA using the second sensing beam and a second EDT. The second EDT determined in accordance with the second scale factor.

Figure 16:
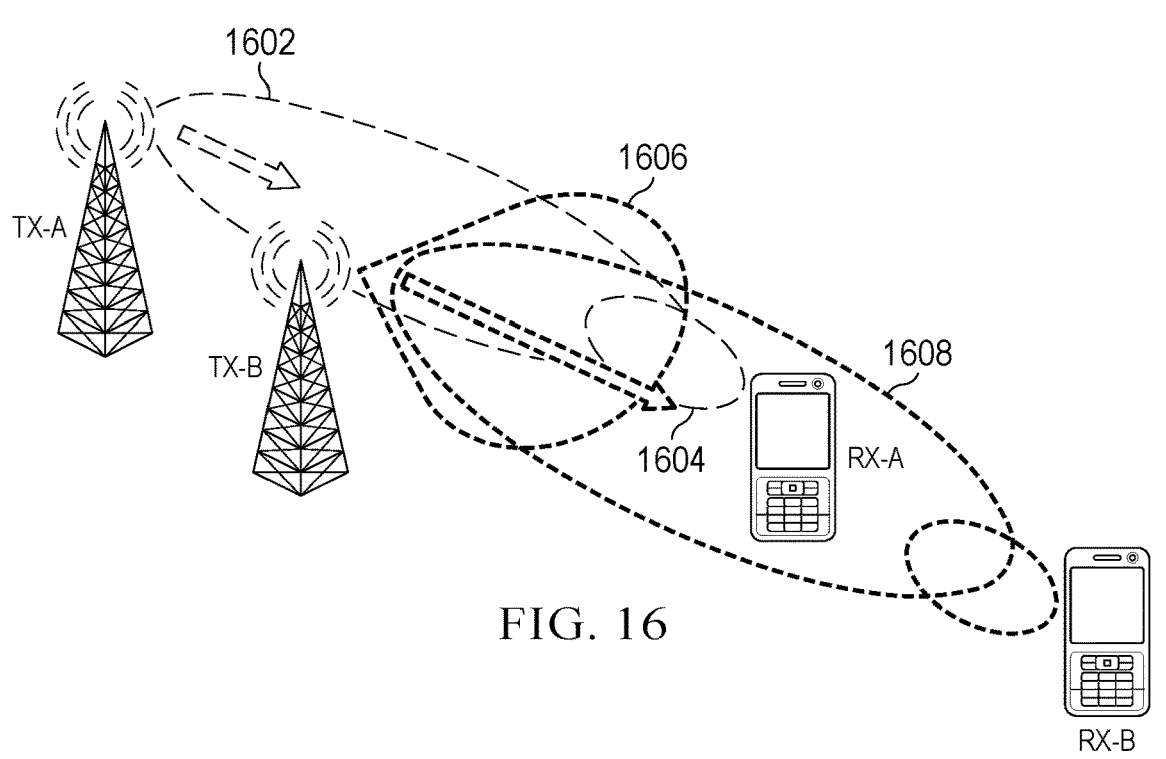
FIG. 16 illustrates an example of a directional sensing beam failing to detect an ongoing transmission due to blind spots.
Figure 17:
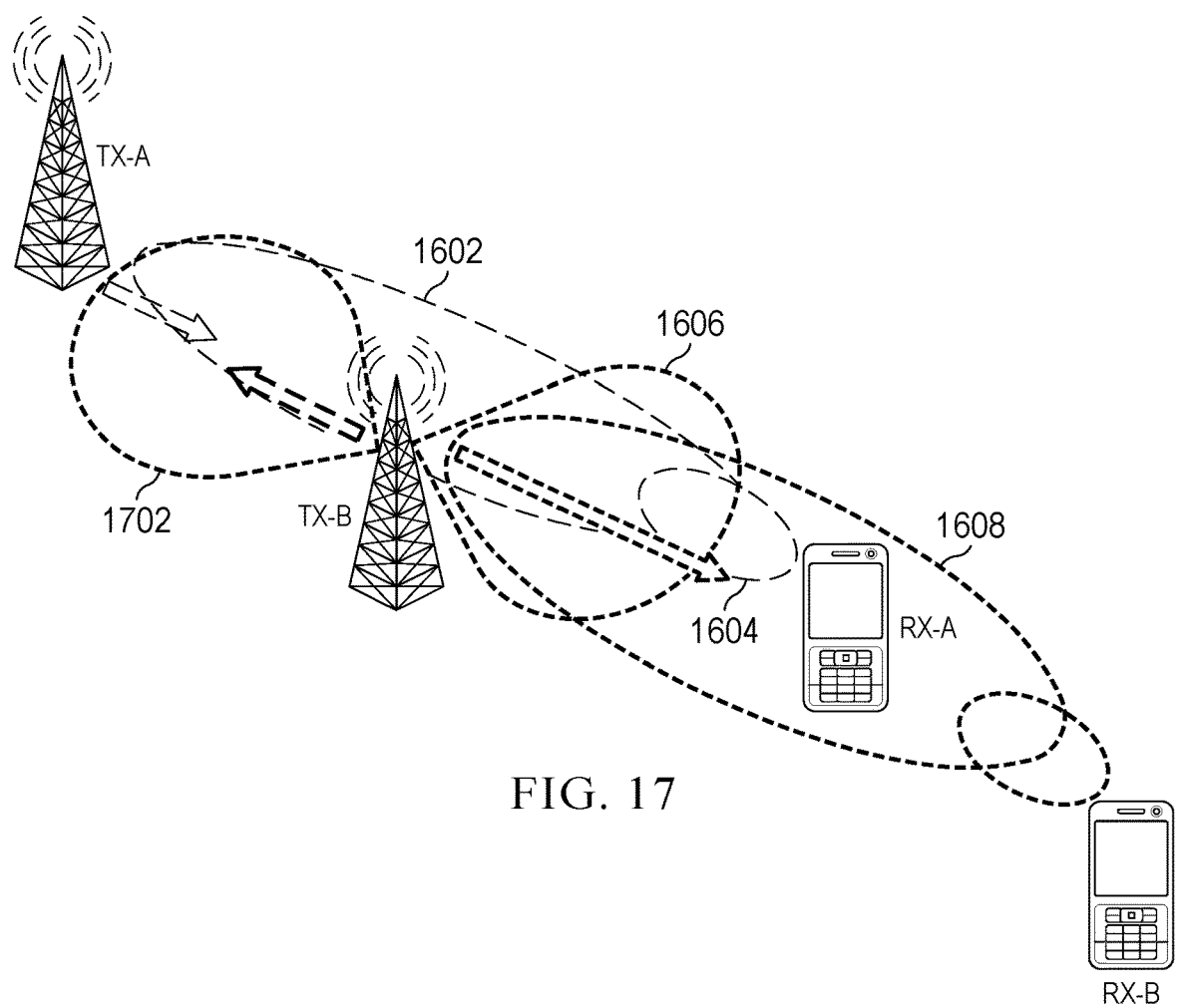
FIG. 17 illustrates an embodiment of an augmented sensing beam.

In directional LBT there can be increased sensitivity to blind spots as opposed to omni or quasi-omni sensing patterns. An example is depicted in FIG. 16. Here, there is an ongoing transmission between wireless communication devices TX-A (using a transmission beam 1602) and RX-A (using a reception beam 1604). An LBT process is initiated by a wireless communication device TX-B in order to setup a new transmission between TX-B and RX-B. However, the LBT performed at TX-B using a sensing beam 1606 aligned with an intended transmit beam 1608 cannot sense the ongoing transmission. On the other hand, using an augmented sensing beam 1702, wherein a back or mirror lobe is added to the original sensing beam, as shown in FIG. 17, can sense the ongoing transmission. Using the augmented sensing beam 1702, TX-B will correctly declare channel busy and backoff. Note that augmenting using the back-lobe or mirror-lobe is not reverting to an omni or quasi-omni sensing pattern and does not lead to excessive exposed nodes.

In one embodiment the set of angular coordinates $\Omega^{(j)}$ that was defined previously can be augmented. Recall that previous choices outlined for constructing $\Omega^{(j)}$ only considered directions with relatively larger transmit APP for inclusion into $\Omega^{(j)}$. These choices clearly will not include the bling spot highlighted above. As a remedy $\Omega^{(j)}$ can be augmented by including mirror (or opposite) directions for each direction originally present in $\Omega^{(j)}$. Then, over the obtained augmented set a sensing pattern requirement as in (3) may be imposed and the associated EDT formula may be used.

In another embodiment equation (4) may be used to define the sensing pattern requirement and use the modified formula proposed previously after (4) to compute the EDT.

In another embodiment instead of augmenting $\Omega^{(j)}$ another set of directions $\tilde{\Omega}^{(j)}$ comprising of mirror (or opposite) directions for all or a subset of directions originally present in $\Omega^{(j)}$ may be determined. For a direction defined by (elevation angle, azimuth angle) pair $(\Theta, \Phi)$, a direction opposite to it is defined by (elevation angle, azimuth angle) pair $(\Theta, \Phi+\pi)$.

Separate sensing beam requirements for both $\Omega^{(j)}$ and $\tilde{\Omega}^{(j)}$ may be defined. The sensing beam requirement for $\tilde{\Omega}^{(j)}$ can be defined using (3) and EDT can be determined using the associated EDT formula. Alternatively, equation (4) may be used to define the sensing pattern requirement for $\tilde{\Omega}^{(j)}$ and use the modified formula proposed previously after (4) to compute the EDT. On the other hand, the sensing beam requirement and attendant EDT computation for the set of directions in $\Omega^{(j)}$ can use any one of the approaches highlighted before. The scale-factors for these two sensing beams can be different, i.e., different $\alpha^{(j)}$ and $\tilde{\alpha}^{(j)}$ may be used in (4) and the corresponding EDT formula. In this embodiment two rounds of LBT using the two separate sensing beams are done.

In another embodiment the LBT done using the sensing pattern determined for the set $\tilde{\Omega}^{(j)}$ can be a CAT 2 LBT which does not entail a random backoff.

In another embodiment the twin requirements for sensing can be specified as follows. First a sensing beam is said to cover a set of transmit beams (in the forward directions i.e., directions towards intended transmissions), if the Y dB beam-width of the sensing beam includes all directions (or angle pairs) that lie in the X-dB beam width of every transmit beam in the set of beams covered by that sensing beam, and further the value Y and possibly the peak sensing gain will be used to adapt the EDT. In addition, that beam is said to provide a cover in the opposite directions (directions opposite to the intended transmit directions) if for all directions opposite to those in the Z-dB beam width of every transmit beam in the set of beams covered by that sensing beam, the gain of that sensing beam is above a threshold X.

In another embodiment there can be two sensing beams, one defined for forward directions using X and Y and another defined for the opposite directions using Z and X.

Remark here that a primary goal of augmenting the sensing is to ensure disruptions to ongoing transmissions (which cannot be sensed by considering forward directions alone) are minimized. Consequently, while the sensing requirement for the forward directions can be for instance defined using (2a) which allows for the sensing gain to match (up-to a constant) the varying normalized transmit APP, for the opposite directions an omni pattern over an angular coordinate or direction set of interest may be desired. The latter aims to sense ongoing transmissions from other transmitters serving users (clients) in the interference footprint of the transmission intended by the initiator node, without making further assumptions about the beamforming employed by those transmitters.

New link TX-B-RX-B creates interference to existing link but is incorrectly allowed. The red tick represents this incorrect pass of CCA check (false positive).

TX-B will then correctly back-off. The green cross represents the correct fail of CCA check (true negative).

An embodiment includes: Clustering set of intended TX beams into multiple beam groups (beam clusters); Number of clusters can be an explicit input or can be itself determined by clustering algorithm; For each cluster composite transmit angular power profile (APP) or Max-hold EIRP is determined; Max-hold EIRP in each direction is the maximal among EIRPs of all beams in cluster in that direction; A set of angular coordinates (directions) is identified; In one embodiment this set can be all directions within X-dB of peak; Sensing beam requirements are defined for each group using its determined composite transmit APP and over its identified set. Scaling factor for modifying energy detection threshold (EDT) is also determined.

Figure 18:
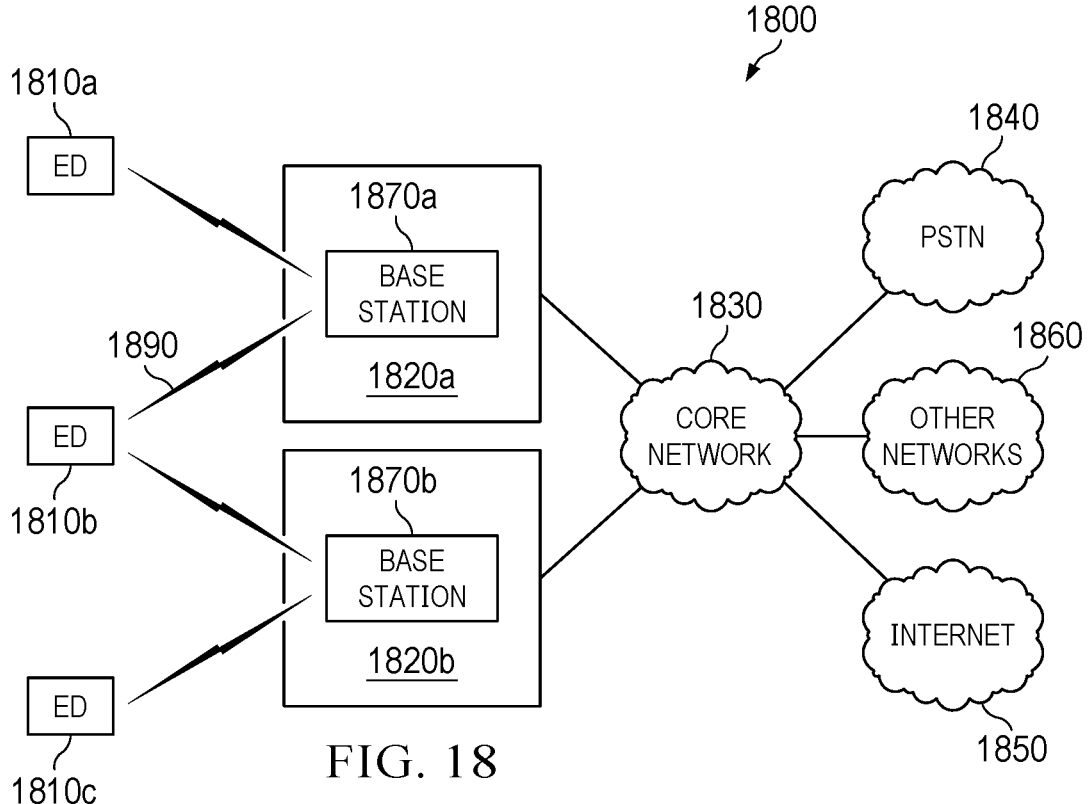
FIG. 18 illustrates an example communication system.

FIG. 18 illustrates an example communication system 1800. In general, the system 1800 enables multiple wireless or wired users to transmit and receive data and other content. The system 1800 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1800 includes electronic devices (ED) 1810a-1810c, radio access networks (RANs) 1820a-1820b, a core network 1830, a public switched telephone network (PSTN) 1840, the Internet 1850, and other networks 1860. While certain numbers of these components or elements are shown in FIG. 18, any number of these components or elements may be included in the system 1800.

The EDs 1810a-1810c are configured to operate or communicate in the system 1800. For example, the EDs 1810a-1810c are configured to transmit or receive via wireless or wired communication channels. Each ED 1810a-1810c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1820a-1820b here include base stations 1870a-1870b, respectively. Each base station 1870a-1870b is configured to wirelessly interface with one or more of the EDs 1810a-1810c to enable access to the core network 1830, the PSTN 1840, the Internet 1850, or the other networks 1860. For example, the base stations 1870a-1870b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1810a-1810c are configured to interface and communicate with the Internet 1850 and may access the core network 1830, the PSTN 1840, or the other networks 1860.

In the embodiment shown in FIG. 18, the base station 1870*a* forms part of the RAN 1820*a*, which may include other base stations, elements, or devices. Also, the base station 1870*b* forms part of the RAN 1820*b*, which may include other base stations, elements, or devices. Each base station 1870*a*-1870*b* operates to transmit or receive wireless signals within a particular geographic region or area, sometimes referred to as a "cell." In some embodiments, multiple-input multiple-output (MIMO) technology may be employed having multiple transceivers for each cell.

The base stations 1870*a*-1870*b* communicate with one or more of the EDs 1810*a*-1810*c* over one or more air interfaces 1890 using wireless communication links. The air interfaces 1890 may utilize any suitable radio access technology.

It is contemplated that the system 1800 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1820*a*-1820*b* are in communication with the core network 1830 to provide the EDs 1810*a*-1810*c* with voice, data, application, Voice over Internet Protocol (VoIP), or other services. Understandably, the RANs 1820*a*-1820*b* or the core network 1830 may be in direct or indirect communication with one or more other RANs (not shown). The core network 1830 may also serve as a gateway access for other networks (such as the PSTN 1840, the Internet 1850, and the other networks 1860). In addition, some or all of the EDs 1810*a*-1810*c* may include functionality for communicating with different wireless networks over different wireless links using different wireless technologies or protocols. Instead of wireless communication (or in addition thereto), the EDs may communicate via wired communication channels to a service provider or switch (not shown), and to the Internet 1850.

Although FIG. 18 illustrates one example of a communication system, various changes may be made to FIG. 18. For example, the communication system 1800 could include any number of EDs, base stations, networks, or other components in any suitable configuration.

Figure 19A:
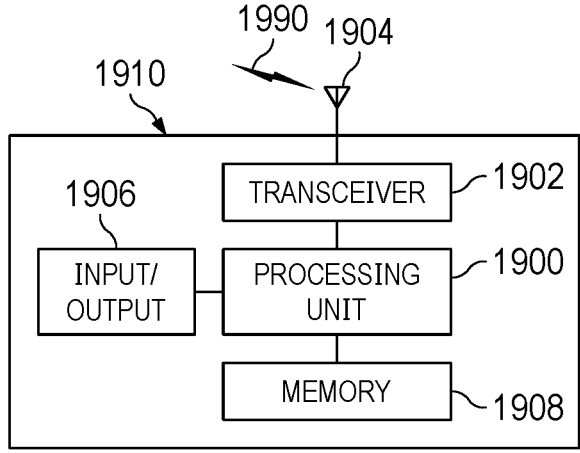
FIGS. 19A-19B illustrate embodiment devices for implementing the methods and teachings according to this disclosure.
Figure 19B:
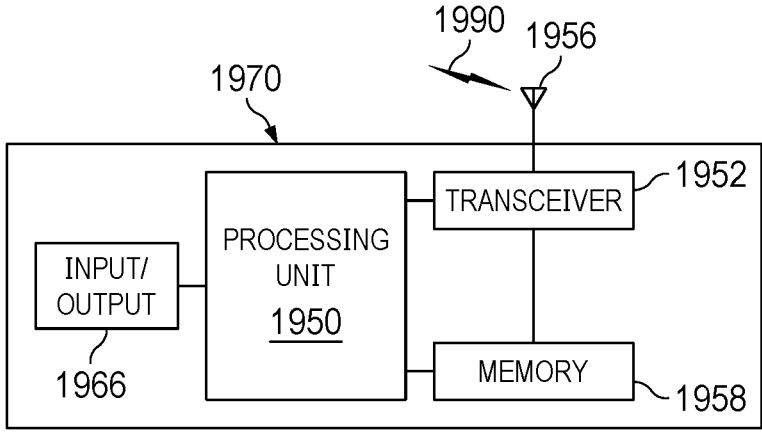

FIGS. 19A and 19B illustrate example devices that may implement the methods and teachings according to this disclosure. In particular, FIG. 19A illustrates an example ED 1910, and FIG. 19B illustrates an example base station 1970. These components could be used in the system 1800 or in any other suitable system.

As shown in FIG. 19A, the ED 1910 includes at least one processing unit 1900. The processing unit 1900 implements various processing operations of the ED 1910. For example, the processing unit 1900 could perform signal coding, data processing, power control, input/output processing, or any other functionality enabling the ED 1910 to operate in the system 1800. The processing unit 1900 also supports the methods and teachings described in more detail above. Each processing unit 1900 includes any suitable processing or computing device configured to perform one or more operations. Each processing unit 1900 could, for example, include a microprocessor, microcontroller, digital signal processor, field programmable gate array, or application specific integrated circuit.

The ED 1910 also includes at least one transceiver 1902. The transceiver 1902 is configured to modulate data or other content for transmission by at least one antenna or NIC (Network Interface Controller) 1904. The transceiver 1902 is also configured to demodulate data or other content received by the at least one antenna 1904. Each transceiver 1902 includes any suitable structure for generating signals for wireless or wired transmission or processing signals received wirelessly or by wire. Each antenna 1904 includes any suitable structure for transmitting or receiving wireless or wired signals. One or multiple transceivers 1902 could be used in the ED 1910, and one or multiple antennas 1904 could be used in the ED 1910. Although shown as a single functional unit, a transceiver 1902 could also be implemented using at least one transmitter and at least one separate receiver.

The ED 1910 further includes one or more input/output devices 1906 or interfaces (such as a wired interface to the Internet 1850). The input/output devices 1906 facilitate interaction with a user or other devices (network communications) in the network. Each input/output device 1906 includes any suitable structure for providing information to or receiving information from a user, such as a speaker, microphone, keypad, keyboard, display, or touch screen, including network interface communications.

In addition, the ED 1910 includes at least one memory 1908. The memory 1908 stores instructions and data used, generated, or collected by the ED 1910. For example, the memory 1908 could store software or firmware instructions executed by the processing unit(s) 1900 and data used to reduce or eliminate interference in incoming signals. Each memory 1908 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 19B, the base station 1970 includes at least one processing unit 1950, at least one transceiver 1952, which includes functionality for a transmitter and a receiver, one or more antennas 1956, at least one memory 1958, and one or more input/output devices or interfaces 1966. A scheduler, which would be understood by one skilled in the art, is coupled to the processing unit 1950. The scheduler could be included within or operated separately from the base station 1970. The processing unit 1950 implements various processing operations of the base station 1970, such as signal coding, data processing, power control, input/output processing, or any other functionality. The processing unit 1950 can also support the methods and teachings described in more detail above. Each processing unit 1950 includes any suitable processing or computing device configured to perform one or more operations. Each processing unit 1950 could, for example, include a microprocessor, microcontroller, digital signal processor, field programmable gate array, or application specific integrated circuit.

Each transceiver 1952 includes any suitable structure for generating signals for wireless or wired transmission to one or more EDs or other devices. Each transceiver 1952 further includes any suitable structure for processing signals received wirelessly or by wire from one or more EDs or other devices. Although shown combined as a transceiver 1952, a transmitter and a receiver could be separate components. Each antenna 1956 includes any suitable structure for transmitting or receiving wireless or wired signals. While a common antenna 1956 is shown here as being coupled to the transceiver 1952, one or more antennas 1956 could be coupled to the transceiver(s) 1952, allowing separate antennas 1956 to be coupled to the transmitter and the receiver if equipped as separate components. Each memory 1958 includes any suitable volatile or non-volatile storage and retrieval device(s). Each input/output device 1966 facilitates interaction with a user or other devices (network communications) in the network. Each input/output device 1966 includes any suitable structure for providing information to or receiving/providing information from a user, including network interface communications.

Figure 20:
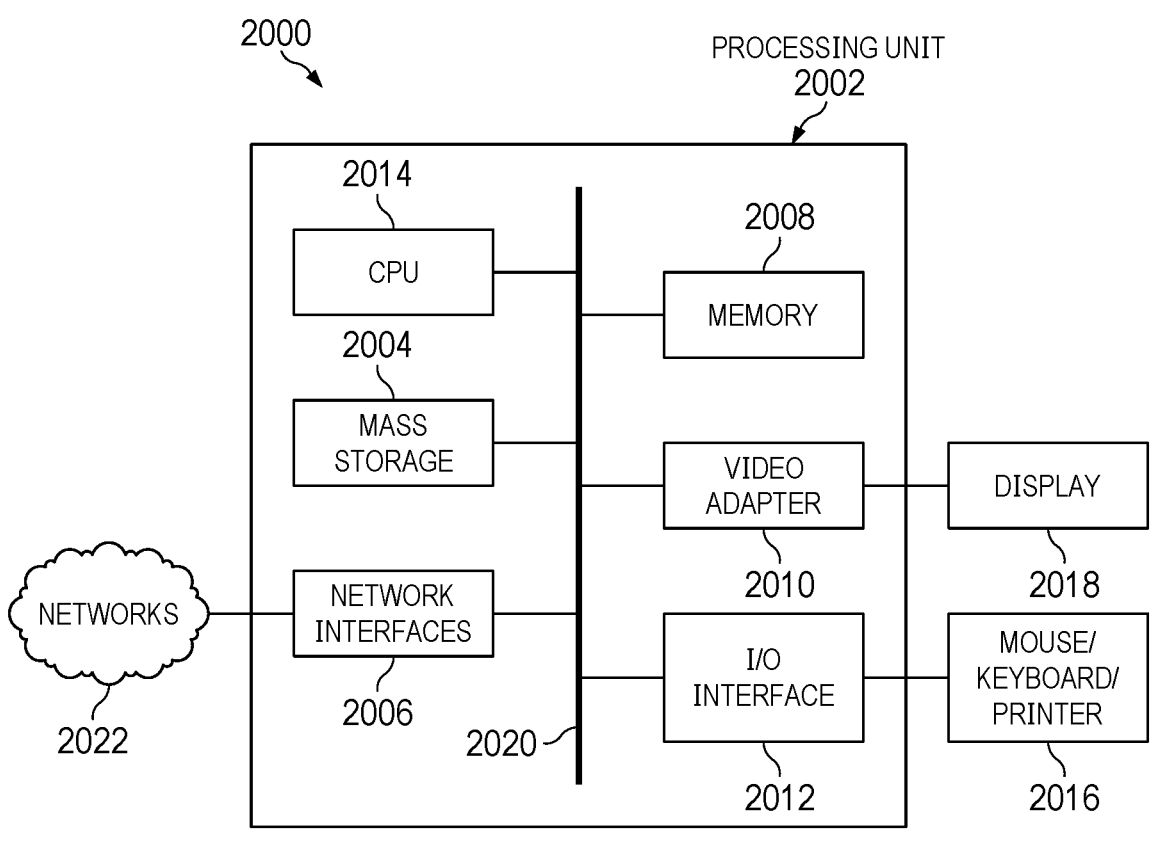
FIG. 20 illustrates a block diagram of an embodiment computing system.

FIG. 20 is a block diagram of a computing system 2000 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 2000 includes a processing unit 2002. The processing unit includes a central processing unit (CPU) 2014, memory 2008, and may further include a mass storage device 2004, a video adapter 2010, and an I/O interface 2012 connected to a bus 2020.

The bus 2020 may be one or more of any type of several bus architectures including a memory bus or memory controller, a peripheral bus, or a video bus. The CPU 2014 may comprise any type of electronic data processor. The memory 2008 may comprise any type of non-transitory system memory such as static random access memory (SRAM), dynamic random access memory (DRAM), synchronous DRAM (SDRAM), read-only memory (ROM), or a combination thereof. In an embodiment, the memory 2008 may include ROM for use at boot-up, and DRAM for program and data storage for use while executing programs.

The mass storage 2004 may comprise any type of non-transitory storage device configured to store data, programs, and other information and to make the data, programs, and other information accessible via the bus 2020. The mass storage 2004 may comprise, for example, one or more of a solid state drive, hard disk drive, a magnetic disk drive, or an optical disk drive.

The video adapter 2010 and the I/O interface 2012 provide interfaces to couple external input and output devices to the processing unit 2002. As illustrated, examples of input and output devices include a display 2018 coupled to the video adapter 2010 and a mouse, keyboard, or printer 2016 coupled to the I/O interface 2012. Other devices may be coupled to the processing unit 2002, and additional or fewer interface cards may be utilized. For example, a serial interface such as Universal Serial Bus (USB) (not shown) may be used to provide an interface for an external device.

The processing unit 2002 also includes one or more network interfaces 2006, which may comprise wired links, such as an Ethernet cable, or wireless links to access nodes or different networks. The network interfaces 2006 allow the processing unit 2002 to communicate with remote units via the networks. For example, the network interfaces 2006 may provide wireless communication via one or more transmitters/transmit antennas and one or more receivers/receive antennas. In an embodiment, the processing unit 2002 is coupled to a local-area network 2022 or a wide-area network for data processing and communications with remote devices, such as other processing units, the Internet, or remote storage facilities.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Furthermore, any aspects of different embodiments in this disclosure may be combined. Accordingly, the appended claims are intended to include within their scope such processes, machines, manufacture, compositions of matter, means, methods, or steps.

What is claimed is:

1. A method for directional channel sensing, the method comprising:
   determining, by a wireless communication device, a first sensing beam requirement for a first subset of transmission beams;
   determining, by the wireless communication device, a first sensing beam and a first scale factor so that the first sensing beam covering the first subset of transmission beams satisfies the first sensing beam requirement scaled by the first scale factor, the first sensing beam being selected from a set of candidate sensing beams;
   performing, by the wireless communication device, a first Clear Channel Assessment (CCA) using the first sensing beam and a first energy detection threshold (EDT), the first EDT determined in accordance with the first scale factor;
   determining a second sensing beam requirement for a second subset of transmission beams;
   determining a second sensing beam and a second scale factor so that the second sensing beam covering the second subset of transmission beams satisfies the second sensing beam requirement scaled by the second scale factor, the second sensing beam being selected from the set of candidate sensing beams; and
   performing a second CCA using the second sensing beam and a second EDT, the second EDT determined in accordance with the second scale factor.

2. The method of claim 1, wherein the first sensing beam requirement is that an X dB beamwidth of the first sensing beam includes each direction belonging to a Y dB beamwidth of the first subset of transmission beams, X and Y being configurable parameters.

3. The method of claim 1, wherein the first sensing beam requirement is that a gain of the first sensing beam measured in a direction is larger than a threshold, the direction determined in accordance with the first subset of transmission beams, the threshold determined in accordance with the first sensing beam and the first subset of transmission beams.

4. The method of claim 3, further comprising:
   determining a Max-hold Effective Isotropic Radiated Power (EIRP), the Max-hold EIRP being a pointwise maximum of EIRPs of the first subset of transmission beams.

5. The method of claim 4, wherein the direction is a peak direction of the Max-hold EIRP, and wherein the threshold is X dB of a peak of the Max-hold EIRP, X being a configurable parameter.

6. The method of claim 4, wherein the direction is determined such that the Max-hold EIRP measured in the direction is larger than X dB of a peak of the Max-hold EIRP, and wherein the threshold is Y dB of the Max-hold EIRP measured in the direction, X and Y being configurable parameters.

7. The method of claim 4, wherein the direction is determined such that the Max-hold EIRP measured in the direction is larger than X dB of a peak of the Max-hold EIRP, and wherein the threshold is Y dB of a peak gain of the first sensing beam, X and Y being configurable parameters.

8. The method of claim 3, further comprising determining a composite transmit angular power profile (APP), the composite transmit APP being an envelope of APPs of the first subset of transmission beams, wherein the direction is determined such that the composite transmit APP measured in the direction is larger than X dB of a peak of the composite transmit APP, and wherein the threshold is Y dB of the composite transmit APP measured in the direction divided by the peak of the composite transmit APP, X and Y being configurable parameters.

9. The method of claim 1, wherein in response to no sensing beam in the set of candidate sensing beams satisfying the first sensing beam requirement without scaling by the first scale factor, the first sensing beam requirement scaled by the first scale factor is that a gain of the first sensing beam measured in a direction is larger than a threshold multiplied by the first scale factor.

10. The method of claim 9, wherein the first scale factor is a largest positive value such that at least one sensing beam in the set of candidate sensing beams satisfies the first sensing beam requirement scaled by the first scale factor, and wherein the first sensing beam is selected from the at least one sensing beam.

11. The method of claim 1, wherein in response to at least one sensing beam in the set of candidate sensing beams satisfying the first sensing beam requirement, the first sensing beam requirement scaled by the first scale factor is the same as the first sensing beam requirement, the first scale factor being 1 and the first sensing beam being selected from the at least one sensing beam.

12. A wireless communication device comprising:

a non-transitory memory storage comprising instructions; and one or more processors in communication with the non-transitory memory storage, wherein the one or more processors execute the instructions to perform:

determining a first sensing beam requirement for a first subset of transmission beams;

determining a first sensing beam and a first scale factor so that the first sensing beam covering the first subset of transmission beams satisfies the first sensing beam requirement scaled by the first scale factor, the first sensing beam being selected from a set of candidate sensing beams;

performing a first Clear Channel Assessment (CCA) using the first sensing beam and a first energy detection threshold (EDT), the first EDT determined in accordance with the first scale factor;

determining a second sensing beam requirement for a second subset of transmission beams;

determining a second sensing beam and a second scale factor so that the second sensing beam covering the second subset of transmission beams satisfies the second sensing beam requirement scaled by the second scale factor, the second sensing beam being selected from the set of candidate sensing beams; and performing a second CCA using the second sensing beam and a second EDT, the second EDT determined in accordance with the second scale factor.

13. The wireless communication device of claim 12, wherein the first sensing beam requirement is that an X dB beamwidth of the first sensing beam includes each direction belonging to a Y dB beamwidth of the first subset of transmission beams, X and Y being configurable parameters.

14. The wireless communication device of claim 12, wherein the first sensing beam requirement is that a gain of the first sensing beam measured in a direction is larger than a threshold, the direction determined in accordance with the first subset of transmission beams, the threshold determined in accordance with the first sensing beam and the first subset of transmission beams.

15. The wireless communication device of claim 14, wherein the one or more processors further execute the instructions to perform:

determining a Max-hold Effective Isotropic Radiated Power (EIRP), the Max-hold EIRP being a pointwise maximum of EIRPs of the first subset of transmission beams.

16. The wireless communication device of claim 15, wherein the direction is a peak direction of the Max-hold EIRP, and wherein the threshold is X dB of a peak of the Max-hold EIRP, X being a configurable parameter.

17. The wireless communication device of claim 15, wherein the direction is determined such that the Max-hold EIRP measured in the direction is larger than X dB of a peak of the Max-hold EIRP, and wherein the threshold is Y dB of the Max-hold EIRP measured in the direction, X and Y being configurable parameters.

18. The wireless communication device of claim 15, wherein the direction is determined such that the Max-hold EIRP measured in the direction is larger than X dB of a peak of the Max-hold EIRP, and wherein the threshold is Y dB of a peak gain of the first sensing beam, X and Y being configurable parameters.

19. The wireless communication device of claim 14, wherein the one or more processors further execute the instructions to determine a composite transmit angular power profile (APP), the composite transmit APP being an envelope of APPs of the first subset of transmission beams, wherein the direction is determined such that the composite transmit APP measured in the direction is larger than X dB of a peak of the composite transmit APP, and wherein the threshold is Y dB of the composite transmit APP measured in the direction divided by the peak of the composite transmit APP, X and Y being configurable parameters.

20. The wireless communication device of claim 12, wherein in response to no sensing beam in the set of candidate sensing beams satisfying the first sensing beam requirement without scaling by the first scale factor, the first sensing beam requirement scaled by the first scale factor is that a gain of the first sensing beam measured in a direction is larger than a threshold multiplied by the first scale factor.

21. The wireless communication device of claim 20, wherein the first scale factor is a largest positive value such that at least one sensing beam in the set of candidate sensing beams satisfies the first sensing beam requirement scaled by the first scale factor, and wherein the first sensing beam is selected from the at least one sensing beam.

22. The wireless communication device of claim 12, wherein in response to at least one sensing beam in the set of candidate sensing beams satisfying the first sensing beam requirement, the first sensing beam requirement scaled by the first scale factor is the same as the first sensing beam requirement, the first scale factor being 1 and the first sensing beam being selected from the at least one sensing beam.

23. A non-transitory computer-readable medium having instructions stored thereon that, when executed by an apparatus, cause the apparatus to perform operations for directional channel sensing, the operations comprising:

determining a first sensing beam requirement for a first subset of transmission beams;

determining a first sensing beam and a first scale factor so that the first sensing beam covering the first subset of transmission beams satisfies the first sensing beam requirement scaled by the first scale factor, the first sensing beam being selected from a set of candidate sensing beams;

performing a first Clear Channel Assessment (CCA) using the first sensing beam and a first energy detection threshold (EDT), the first EDT determined in accordance with the first scale factor;

determining a second sensing beam requirement for a second subset of transmission beams;

determining a second sensing beam and a second scale factor so that the second sensing beam covering the second subset of transmission beams satisfies the second sensing beam requirement scaled by the second scale factor, the second sensing beam being selected from the set of candidate sensing beams; and performing a second CCA using the second sensing beam and a second EDT, the second EDT determined in accordance with the second scale factor.

* * * * *